US008975346B2

(12) United States Patent
Markanday et al.

(10) Patent No.: US 8,975,346 B2
(45) Date of Patent: Mar. 10, 2015

(54) POLYCARBONATE COPOLYMERS VIA CONTROLLED RADICAL POLYMERIZATION

(75) Inventors: Meghna Markanday, Karnataka (IN); Balakrishnan Ganesan, Gujarat (IN); Theo Hoeks, Bergen op Zoom (NL); Jan Henk Kamps, Bergen op Zoom (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 320 days.

(21) Appl. No.: 13/475,379

(22) Filed: May 18, 2012

(65) Prior Publication Data

US 2013/0310524 A1    Nov. 21, 2013

(51) Int. Cl.
    *C08F 283/02*    (2006.01)
    *C08G 64/18*    (2006.01)
(52) U.S. Cl.
    USPC ............ 525/468; 528/199; 528/200; 528/202
(58) Field of Classification Search
    None
    See application file for complete search history.

(56) References Cited

U.S. PATENT DOCUMENTS

| | | | |
|---|---|---|---|
| 4,310,642 A | 1/1982 | Margotte et al. | |
| 4,319,003 A * | 3/1982 | Gardlund | 525/148 |
| 5,580,925 A | 12/1996 | Iwahara et al. | |
| 5,763,548 A * | 6/1998 | Matyjaszewski et al. | 526/135 |
| 5,807,937 A | 9/1998 | Matyjaszewski et al. | |
| 5,945,491 A | 8/1999 | Matyjaszewski et al. | |
| 6,111,022 A | 8/2000 | Matyjaszewski et al. | |
| 6,441,066 B1 | 8/2002 | Woodworth et al. | |
| 7,157,530 B2 | 1/2007 | Matyjaszewski et al. | |
| 7,335,703 B2 | 2/2008 | Fukui | |
| 7,488,780 B2 | 2/2009 | Noguchi et al. | |
| 7,678,869 B2 | 3/2010 | Matyjaszewski et al. | |
| 7,868,097 B2 | 1/2011 | Kaneko et al. | |
| 2004/0127638 A1 | 7/2004 | Mathew et al. | |
| 2006/0211824 A1 | 9/2006 | Sakamoto et al. | |
| 2009/0142537 A1 | 6/2009 | Hong et al. | |
| 2009/0171024 A1 | 7/2009 | Jakubowski et al. | |
| 2011/0178246 A1 | 7/2011 | Moeller et al. | |
| 2011/0189469 A1 | 8/2011 | Stenzel et al. | |
| 2011/0240550 A1 | 10/2011 | Moore et al. | |

FOREIGN PATENT DOCUMENTS

| | | |
|---|---|---|
| CA | 2510397 A1 | 10/1996 |
| CA | 2237055 A1 | 5/1997 |
| CA | 2259995 A1 | 1/1998 |
| CA | 2335777 A1 | 12/1999 |
| CA | 2436568 A1 | 9/2002 |
| EP | 1396504 A2 | 3/2004 |
| EP | 1637543 A2 | 3/2006 |
| EP | 1908787 A1 | 4/2008 |
| GB | 233895 A | 5/1925 |
| JP | 2000072841 A | 3/2000 |
| JP | 2000169665 A | 6/2000 |
| JP | 2002293850 A | 10/2002 |
| JP | 2003026724 A | 1/2003 |
| JP | 2004091640 A | 3/2004 |
| JP | 2005281459 A | 10/2005 |
| JP | 2007169318 A | 7/2007 |
| JP | 2008024833 A | 2/2008 |
| JP | 2008239893 A | 10/2008 |
| JP | 2010144080 A | 7/2010 |
| JP | 2010222535 A | 10/2010 |
| JP | 2010254850 A | 11/2010 |
| WO | WO-0011055 A1 | 3/2000 |
| WO | WO-0140339 A1 | 6/2001 |
| WO | WO-0144376 A1 | 6/2001 |
| WO | WO-0144388 A2 | 6/2001 |
| WO | WO-0230992 A2 | 4/2002 |
| WO | WO-2005061569 A1 | 7/2005 |
| WO | WO-2007/094979 A1 | 8/2007 |
| WO | WO-2010009911 A1 | 1/2010 |
| WO | WO-2011123033 A1 | 10/2011 |

OTHER PUBLICATIONS

Mennicken, A Novel Macroinitiator for the Synthesis of Triblock Copolymers via ATRP; Macromol Chem Phys , (2004), 205, pp. 143-153.*
Shen, Synthesis of polystyrene-block-polycarbonate-blockpolystyrene and polycarbonate-graft-polystyrene . . . ;Polymer Bulletin 49 (2003), pp. 321-328.*
Choi, et al., "Synthesis of Polycarbonate-Poly(methyl methacrylate) copolymer via sonochemical polymerization of Methyl Methacrylate in Polycarbonate solution," Macromol. Symp. 2007, 249-250, 350-356.
Okamoto, M., "Effect of Polycarbonate-Poly(methyl methacrylate) Graft Copolymer as a Modifier Improving the Surface Hardness of Polycarbonate," Journal of Applied Polymer Science, vol. 83, 2774-2779 (2002).
Mennicken, M. et al., "A Novel Macroinitiator for the Synthesis of Triblock Copolymers via Atom Transfer Radical Polymerization: Polystyrene-block-poly(bisphenol A carbonate)-blockpolystyrene and Poly(methyl methacrylate)-blockpoly(bisphenol A carbonate)-block-poly(methyl methacrylate)," Macromol. Chem. Phys. 2004, 205, pp. 143-153.
Kang, E. et al., "The Effects of PC-PMMA Block Copolymer on the Compatibility and Interfacial Properties of PC/SAN Blends," *Polymer Engineering and Science*, Nov. 2000, vol. 40, No. 11, pp. 2374-2384.
International Search Report issued by the International Bureau on Jul. 31, 2013 for PCT/IB2013/053727 filed on May 8, 2013 (Applicant—SABIC Innovative Plastics IP B.V. // Inventors—Markanday et al.) (4 pages).
Written Opinion issued by the International Bureau on Jul. 31, 2013 for PCT/IB2013/053727 filed on May 8, 2013 (Applicant—SABIC Innovative Plastics IP B.V. // Inventors—Markanday et al.) (4 pages).

* cited by examiner

*Primary Examiner* — David Buttner
(74) *Attorney, Agent, or Firm* — Baker & Hostetler LLP

(57) ABSTRACT

In one aspect, the invention relates to relates to copolymer compositions comprising domains of polycarbonate and polyacrylate, and to methods of preparing the copolymers, wherein the method comprises reacting a polycarbonate macroinitator with a vinyl monomer by atom transfer radical polymerization. This abstract is intended as a scanning tool for purposes of searching in the particular art and is not intended to be limiting of the present invention.

48 Claims, 12 Drawing Sheets

POLYCARBONATE COPOLYMERS VIA CONTROLLED RADICAL POLYMERIZATION

FIELD OF INVENTION

The present invention relates to compositions comprising copolymers of polycarbonate and polyacrylate prepared using a controlled radical polymerization technique that have appropriate optical clarity and scratch resistance.

BACKGROUND

Polycarbonates ("PC") are synthetic thermoplastic resins derived from bisphenols and phosgene, or their derivatives. They are linear polyesters of carbonic acid and can be formed from dihydroxy compounds and carbonate diesters, or by ester interchange. Polymerization may be in aqueous, interfacial, or in nonaqueous solution.

Polycarbonate-based materials are used in a broad variety of applications because of their high transparency, clarity, heat resistance, ignition resistance, toughness, stability, impact resistance, creep resistance, and mechanical strength. However, polycarbonate-based materials are less resistant to scratching and surface marring compared to other materials. In particular, polycarbonates based on bisphenol A ("BPA") have limited scratch resistance. One method of preventing or minimizing scratch damage is to apply a hardcoat to an article formed from a BPA polycarbonate. Such an approach has several disadvantages, including requiring another manufacturing step, thus adding additional cost to the article, compromised durability and increased production complexity. Another method is to use a scratch-resistant material made from a copolymer of BPA and dimethyl bisphenol cyclohexane ("DMBPC"). However, these copolymers also have decreased impact properties and ductility compared to polycarbonates based on BPA. In contrast, polymers such as poly (methyl methacrylate) ("PMMA") possess a high resistance to scratching. However, PMMA does not possess the appropriate structural properties, e.g. it does not have the mechanical strength of PC and it behaves in a brittle manner under an impact force.

Scratch resistance is useful for articles whose exterior surface may be subject to physical contact by other objects. For example, everyday activities which can scratch an article can include sliding on a surface, dropping, and rubbing against other items such as coins or keys when placed in a pocket. Polymer compositions with scratch resistance are therefore desirable in articles requiring a durable surface finish and appearance. Frequently, it is desirable that these articles have not only the scratch resistance afforded by a PMMA polymer, but also the strength and clarity of a PC polymer.

Copolymers of PC and PMMA is potentially an attractive solution to the foregoing problem. Unfortunately, despite significant need and effort to combine the desirable properties of these materials, PC and PMMA, there has been limited success. For example, the synthesis of polycarbonate-poly (methyl methacrylate) copolymer via sonochemical polymerization of methyl methacrylate ("MMA") monomers with PC has been reported (see M. Choi, et al., Macromol. Symp. (2007) 249-250:350-356). In the method described, PC radicals were generated via sonication and then free radical polymerization with MMA allowed to proceed. Despite the ability to generate PC-PMMA copolymers, the method did not yield high molecular weight copolymers nor does free radical polymerization provide control over the final architecture of the copolymer. E. A. Kang and co-workers (see Poly. Eng. Sci. (2006) 40:2374-2384) prepared PC-PMMA copolymers utilizing vinyl-terminated PC that was polymerized with MMA monomers in the presence of azobisisobutyronitrile ("AIBN") as a free radical initiator. The resulting copolymers had a random morphology. U.S. Pat. No. 4,310,642 discloses the synthesis of graft copolymers of polycarbonate with ethylenic monomers via free radical polymerization. However, as discussed above, free radical polymerization provides little control over the final architecture of the copolymer. US2009/0142537 discloses a thermoplastic blend of PC and a copolymer of MMA and napthyl methacrylate or a substituted methacrylate. Although this blend does provide improved scratch resistance with maintenance of PC optical properties, it is a blend and does not have the advantages of block or graft copolymer. The superiority of a copolymer versus a blend in achieving scratch resistance was explored by M. Okamoto (see J. Appl. Poly. Sci. (2002) 83:2774-2779). Okamoto described the preparation of PC-PMMA graft copolymers from PC oligomers and PMMA macromonomers. The PC-PMMA copolymers of Okamoto had superior clarity and hardness compared to the PC/PMMA blends, but It would be desirable to provide a polycarbonate composition having improved anti-scratch properties that retains the desirable properties of polycarbonate. In particular, it would be desirable to provide such polycarbonates possessing these properties without the need for additional coating or post-mold treatments. The polycarbonate composition would be useful for certain transparent articles, such as optical parts, among other applications.

Accordingly, it would be beneficial to provide block and graft copolymers of polycarbonate and poly(methyl methacrylate) that retain appropriate impact strength and optical clarity properties.

SUMMARY

In accordance with the purpose(s) of the invention, as embodied and broadly described herein, the invention, in one aspect, relates to copolymer compositions comprising domains of polycarbonate and polyacrylate, and to methods of preparing the copolymers, wherein the method comprises reacting a polycarbonate macroinitator with a vinyl monomer by atom transfer radical polymerization. In a further aspect, the copolymer is a block copolymer comprising a polycarbonate block and a polyacrylate block. In a still further aspect, the copolymer compositions have improved optical properties such as increased transparency, increased clarity, and decreased haze.

In various aspects, disclosed are methods for preparing a block copolymer comprising: a) providing a telechelic polycarbonate polymer with terminal hydroxyl groups; wherein the telechelic polycarbonate polymer has a weight average molecular weight of at least about 3,400; and wherein the telechelic polycarbonate polymer comprises aromatic carbonate repeating units; b) esterifying the hydroxyl groups by reaction of the telechelic polycarbonate polymer with an acid halide having a structure represented by a formula:

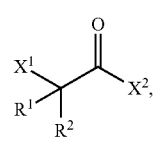

wherein R¹ is selected from hydrogen, C1-C6 alkyl, —(C1-C6 alkyl)-aryl, and aryl; wherein R² is selected from C1-C6 alkyl, —(C1-C6 alkyl)-aryl, and aryl; and wherein each of X¹ and X² is halogen; c) thereby yielding a telechelic polycarbonate macroinitiator having a structure represented by a formula:

Z¹—PC—Z², wherein PC is a polycarbonate polymer comprising aromatic carbonate repeating units; wherein Z¹ and Z² has a formula:

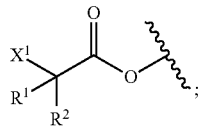

d) reacting the polycarbonate macroinitiator with vinyl monomer by atom transfer radical polymerization; and wherein the atom transfer radical polymerization reaction comprises a catalyst, a catalyst ligand, the vinyl monomer, the polycarbonate macroinitiator, and an optional second initiator; wherein the catalyst is a transition metal or transition metal salt, and wherein the transition metal is selected from Ti, Mo, Re, Fe, Ru, Os, Rh, Co, Ni, Pd, and Cu; wherein the ligand is selected from 2,2'-bipyridine, 4,4'-di(5-nonyl)-2,2'-bipyridine, N,N,N',N'-tetramethylethylenediamine, N-propyl(2-pyridyl)methanimine, 2,2':6',2''-terpyridine, 4,4',4''-tris(5-nonyl)-2,2':6',2''-terpyridine, N,N,N',N'',N'''-pentamethyldiethylenetriamine, N,N-bis(2-pyridylmethyl)octylamine, 1,1,4,7,10,10-hexamethylthethylenetetramine, tris[2-(dimethylamino)ethyl]amine, tris[(2-pyridyl)methyl]amine, 1,4,8,11-tetraaza-1,4,8,11-tetramethylcyclotetradecane, N,N,N',N'-tetrakis(2-pyridylmethyl)ethylenediamine, diethylenetriamine, triethylenetetramine, N,N-bis(2-pyridylmethyl)amine, tris[2-aminoethyl]amine, 1,4,8,11-tetraazacyclotetradecane, and N,N,N',N'-tetrakis(2-pyridylmethyl)ethylenediamine; and wherein the optional second initiator is selected from a peroxide, a hydroperoxide or an azo free radical initiator; e) thereby yielding a block copolymer; wherein the polycarbonate block comprises from about 10% wt to about 90% wt of the block copolymer; and wherein the block copolymer has a weight average molecular weight from about 1,000 to about 70,000.

In a further aspect, disclosed are copolymer compositions comprising: a) a polycarbonate domain; wherein the polycarbonate domain has a weight average molecular weight of at least about 3,400; and wherein the polycarbonate domain comprises aromatic carbonate repeating units; and b) a polyacrylate domain comprising repeating units derived from vinyl monomers; wherein the polyacrylate domain is prepared by atom transfer radical polymerization of vinyl monomers in the presence of the telechelic polycarbonate polymer; and wherein the polyacrylate domain comprises of at least about 2 mol % of the copolymer. In a still further aspect, the copolymer is a block copolymer comprising a polycarbonate block and a polyacrylate block.

In a further aspect, disclosed are methods for preparing a block copolymer comprising: a) providing a telechelic polycarbonate polymer with terminal hydroxyl groups; wherein the telechelic polycarbonate polymer has a weight average molecular weight of at least about 3,400; and wherein the telechelic polycarbonate polymer comprises aromatic carbonate repeating units; b) esterifying the hydroxyl groups by reaction of the telechelic polycarbonate polymer with an acid halide having a structure represented by a formula:

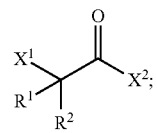

wherein R¹ is selected from methyl and ethyl; wherein R² is selected from methyl and ethyl; and wherein each of X¹ and X² is bromo or chloro; c) thereby yielding a telechelic polycarbonate macroinitiator having a structure represented by a formula:

Z¹—PC—Z², wherein PC is a polycarbonate polymer comprising aromatic carbonate repeating units; wherein Z¹ and Z² has a formula:

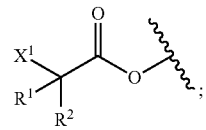

d) reacting the polycarbonate macroinitiator with vinyl monomer by atom transfer radical polymerization; wherein the atom transfer radical polymerization reaction comprises a catalyst, a catalyst ligand, the vinyl monomer, the polycarbonate macroinitiator, and a second initiator; wherein the vinyl monomer is polymethyl methacrylate; wherein the catalyst is a copper salt; wherein the ligand is 2,2'-bipyridine; and wherein the second initiator is azobisisobutyronitrile; and e) thereby yielding a block copolymer; wherein the block copolymer comprises a polycarbonate block and a polymethyl methacrylate block; wherein the polycarbonate block comprises from about 10% wt to about 90% wt of the block copolymer; and wherein the block copolymer has a weight average molecular weight from about 10,000 to about 60,000.

In various aspects, disclosed are methods for preparing a block copolymer comprising: a) providing a telechelic polycarbonate polymer with terminal hydroxyl groups; wherein the telechelic polycarbonate polymer has a weight average molecular weight of at least about 3,400; wherein the telechelic polycarbonate polymer comprises aromatic carbonate repeating units; b) esterifying the hydroxyl groups by reaction of the telechelic polycarbonate polymer with 2-bromoisobutyryl bromide; c) thereby yielding a telechelic polycarbonate macroinitiator having a structure represented by a formula:

Z¹—PC—Z², wherein PC is a polycarbonate polymer comprising aromatic carbonate repeating units; wherein Z¹ and Z² has a formula:

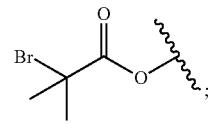

d) reacting the polycarbonate macroinitiator with vinyl monomer by atom transfer radical polymerization; wherein the atom transfer radical polymerization reaction comprises a catalyst, a catalyst ligand, the vinyl monomer, the polycarbonate macroinitiator, and a second initiator; wherein the vinyl monomer is methyl methacrylate; wherein the catalyst is a copper salt; wherein the ligand is 2,2'-bipyridine; wherein the second initiator is azobisisobutyronitrile; and wherein the molar ratio of vinyl monomer, polycarbonate macroinitiator, catalyst, catalyst ligand and second initiator is about 200:1:0.05:0.05:0.1; and e) thereby yielding a block copolymer; wherein the block copolymer comprises a polycarbonate block and a polymethyl methacrylate block; wherein the polycarbonate block comprises from about 10% wt to about 90% wt of the block copolymer; and wherein the block copolymer has a weight average molecular weight from about 20,000 to about 50,000.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

Figure 1:
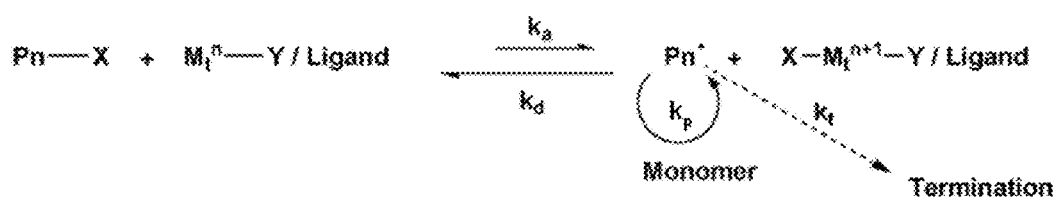
FIG. 1 shows the overall reaction mechanism of atom transfer radical polymerization ("ATRP").

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present invention can be described and claimed in a particular statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DEFINITIONS

It is also to be understood that the terminology used herein is for the purpose of describing particular aspects only and is not intended to be limiting. As used in the specification and in the claims, the term "comprising" may include the embodiments "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like. Furthermore, for example, reference to a filler includes mixtures of fillers.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

As used herein, the term "effective amount" refers to an amount that is sufficient to achieve the desired modification of a physical property of the composition or material. For example, an "effective amount" of a catalyst refers to an amount that is sufficient to achieve the desired acceleration of the reactin under applicable test conditions. The specific level in terms of wt % in a composition required as an effective amount will depend upon a variety of factors including the amount and type of hydrolytic stabilizer, amount and type of polycarbonate polymer compositions, amount and type of impact modifier compositions, and end use of the article made using the composition.

As used herein, the terms "number average molecular weight" or "Mn" can be used interchangeably, and refer to the statistical average molecular weight of all the polymer chains in the sample and is defined by the formula:

$$Mn = \frac{\Sigma N_i M_i}{\Sigma N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art.

As used herein, the terms "weight average molecular weight" or "Mw" can be used interchangeably, and are defined by the formula:

$$Mw = \frac{\Sigma N_i M_i^2}{\Sigma N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. Mw can be determined for polymers, such as polycarbonate polymers or polycarbonate-PMMA copolymers, by methods well known to a person having ordinary skill in the art.

As used herein, the terms "polydispersity index" or "PDI" can be used interchangeably, and are defined by the formula:

$$PDI=Mw/Mn.$$

The PDI has a value equal to or greater than 1, but as the polymer chains approach uniform chain length, the PDI approaches unity.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, chloromethyl, hydroxymethyl (—CH20H), mercaptomethyl (—CH2SH), methoxy, methoxycarbonyl (CH30CO—), nitromethyl (—CH2N02), and thiocarbonyl.

The term "alkyl group" as used herein refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (I.e. one or more hydrogen atoms is replaced) or unsubstituted. Typically, an alkyl group is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group," which can be used interchangeably with "aromatic group," as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group may also include nonaromatic components. For example, a benzyl group is an aryl group that comprises a phenyl ring (the aromatic component) and a methylene group (the nonaromatic component). Exemplary aryl groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl3Ph-). The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may comprise one or more noncyclic components. For example, a cyclohexylmethyl group (C6H11CH2) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4tetramethylcyclobutyl, piperidinyl, and 2,2,6,6-tetramethylpiperydinyl.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula $AOA^1$, where A and $A^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

The term "graft copolymer," as used herein, refers to a type of branched copolymer in which the polymer backbone and the pendant chains are formed from different monomers. This differs from a "block copolymer," wherein the different monomers are present in the backbone. The formula below shows schematically a graft copolymer and a block copolymer, wherein A and B represent distinct monomer units:

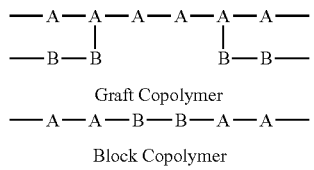

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Copolymer Compositions

In accordance with the purpose(s) of the invention, as embodied and broadly described herein, the invention, in one aspect, relates to copolymer compositions comprising domains of polycarbonate and polyacrylate, and to methods of preparing the copolymers, wherein the method comprises reacting a polycarbonate macroinitator with a vinyl monomer by atom transfer radical polymerization. In a further aspect, the copolymer is a block copolymer comprising a polycarbonate block and a polyacrylate block. In a still further aspect, the copolymer compositions have improved optical properties such as increased transparency, increased clarity, and decreased haze.

In various aspects, disclosed are methods for preparing a block copolymer comprising: a) providing a telechelic polycarbonate polymer with terminal hydroxyl groups; wherein the telechelic polycarbonate polymer has a weight average molecular weight of at least about 3,400; and wherein the telechelic polycarbonate polymer comprises aromatic carbonate repeating units; b) esterifying the hydroxyl groups by reaction of the telechelic polycarbonate polymer with an acid halide having a structure represented by a formula:

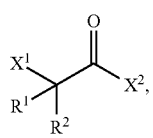

wherein $R^1$ is selected from hydrogen, C1-C6 alkyl, —(C1-C6 alkyl)-aryl, and aryl; wherein $R^2$ is selected from C1-C6 alkyl, —(C1-C6 alkyl)-aryl, and aryl; and wherein each of $X^1$ and $X^2$ is halogen; c) thereby yielding a telechelic polycarbonate macroinitiator having a structure represented by a formula:

$$Z^1-PC-Z^2,$$

wherein PC is a polycarbonate polymer comprising aromatic carbonate repeating units; wherein $Z^1$ and $Z^2$ has a formula:

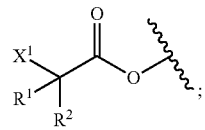

d) reacting the polycarbonate macroinitiator with vinyl monomer by atom transfer radical polymerization; and wherein the atom transfer radical polymerization reaction comprises a catalyst, a catalyst ligand, the vinyl monomer, the polycarbonate macroinitiator, and an optional second initiator; wherein the catalyst is a transition metal or transition metal salt, and wherein the transition metal is selected from Ti, Mo, Re, Fe, Ru, Os, Rh, Co, Ni, Pd, and Cu; wherein the ligand is selected from 2,2'-bipyridine, 4,4'-di(5-nonyl)-2,2'-bipyridine, N,N,N',N'-tetramethylethylenediamine, N-propyl(2-pyridyl)methanimine, 2,2':6',2"-terpyridine, 4,4',4"-tris(5-nonyl)-2,2':6',2"-terpyridine, N,N,N',N",N"-pentamethyldiethylenetriamine, N,N-bis(2-pyridylmethyl) octylamine, 1,1,4,7,10,10-hexamethyltriethylenetetramine, tris[2-(dimethylamino)ethyl]amine, tris[(2-pyridyl)methyl] amine, 1,4,8,11-tetraaza-1,4,8,11-tetramethylcyclotetradecane, N,N,N',N'-tetrakis(2-pyridylmethyl)ethylenediamine, diethylenetriamine, triethylenetetramine, N,N-bis(2-pyridylmethyl)amine, tris[2-aminoethyl]amine, 1,4,8,11-tetraazacyclotetradecane, and N,N,N',N'-tetrakis(2-pyridylmethyl) ethylenediamine; and wherein the optional second initiator is selected from a peroxide, a hydroperoxide or an azo free radical initiator; e) thereby yielding a block copolymer; wherein the polycarbonate block comprises from about 10% wt to about 90% wt of the block copolymer; and wherein the block copolymer has a weight average molecular weight from about 1,000 to about 70,000.

In a further aspect, disclosed are methods for preparing a block copolymer comprising: a) providing a telechelic polycarbonate polymer with terminal hydroxyl groups; wherein the telechelic polycarbonate polymer has a weight average molecular weight of at least about 3,400; and wherein the telechelic polycarbonate polymer comprises aromatic carbonate repeating units; b) esterifying the hydroxyl groups by reaction of the telechelic polycarbonate polymer with an acid halide having a structure represented by a formula:

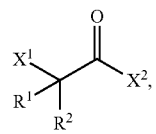

wherein $R^1$ is selected from methyl and ethyl; wherein $R^2$ is selected from methyl and ethyl; and wherein each of $X^1$ and $X^2$ is bromo or chloro; c) thereby yielding a telechelic polycarbonate macroinitiator having a structure represented by a formula:

$$Z^1-PC-Z^2,$$

wherein PC is a polycarbonate polymer comprising aromatic carbonate repeating units; wherein $Z^1$ and $Z^2$ has a formula:

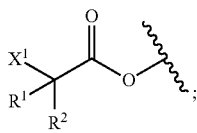

d) reacting the polycarbonate macroinitiator with vinyl monomer by atom transfer radical polymerization; wherein the atom transfer radical polymerization reaction comprises a catalyst, a catalyst ligand, the vinyl monomer, the polycarbonate macroinitiator, and a second initiator; wherein the vinyl monomer is polymethyl methacrylate; wherein the catalyst is a copper salt; wherein the ligand is 2,2'-bipyridine; and wherein the second initiator is azobisisobutyronitrile; and e) thereby yielding a block copolymer; wherein the block copolymer comprises a polycarbonate block and a polymethyl methacrylate block; wherein the polycarbonate block comprises from about 10% wt to about 90% wt of the block copolymer; and wherein the block copolymer has a weight average molecular weight from about 10,000 to about 60,000.

In various aspects, disclosed are methods for preparing a block copolymer comprising: a) providing a telechelic polycarbonate polymer with terminal hydroxyl groups; wherein the telechelic polycarbonate polymer has a weight average molecular weight of at least about 3,400; wherein the telechelic polycarbonate polymer comprises aromatic carbonate repeating units; b) esterifying the hydroxyl groups by reaction of the telechelic polycarbonate polymer with 2-bromoisobutyryl bromide; c) thereby yielding a telechelic polycarbonate macroinitiator having a structure represented by a formula:

Z¹—PC—Z², wherein PC is a polycarbonate polymer comprising aromatic carbonate repeating units; wherein Z¹ and Z² has a formula:

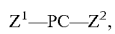

d) reacting the polycarbonate macroinitiator with vinyl monomer by atom transfer radical polymerization; wherein the atom transfer radical polymerization reaction comprises a catalyst, a catalyst ligand, the vinyl monomer, the polycarbonate macroinitiator, and a second initiator; wherein the vinyl monomer is methyl methacrylate; wherein the catalyst is a copper salt; wherein the ligand is 2,2'-bipyridine; wherein the second initiator is azobisisobutyronitrile; and wherein the molar ratio of vinyl monomer, polycarbonate macroinitiator, catalyst, catalyst ligand and second initiator is about 200:1:0.05:0.05:0.1; and e) thereby yielding a block copolymer; wherein the block copolymer comprises a polycarbonate block and a polymethyl methacrylate block; wherein the polycarbonate block comprises from about 10% wt to about 90% wt of the block copolymer; and wherein the block copolymer has a weight average molecular weight from about 20,000 to about 50,000.

In a further aspect, $R^1$ is selected from methyl, ethyl, propyl, and isopropyl. In a still further aspect, $R^1$ is selected from phenyl and napthyl. In a yet further aspect, $R^1$ is methyl. In an even further aspect, $R^1$ is ethyl. In a yet further aspect, $R^1$ is phenyl. In a still further aspect, $R^1$ is napthyl.

In a further aspect, $X^1$ and $X^2$ are each bromo. In a still further aspect, $X^1$ and $X^2$ are each chloro.

In a further aspect, $X^1$ and $X^2$ are each bromo, wherein $R^1$ and $R^2$ are each methyl. In a still further aspect, $X^1$ and $X^2$ are each bromo, wherein $R^1$ is hydrogen; and $R^2$ is phenyl.

In a further aspect, the telechelic polycarbonate macroinitiator has a structure represented by a formula:

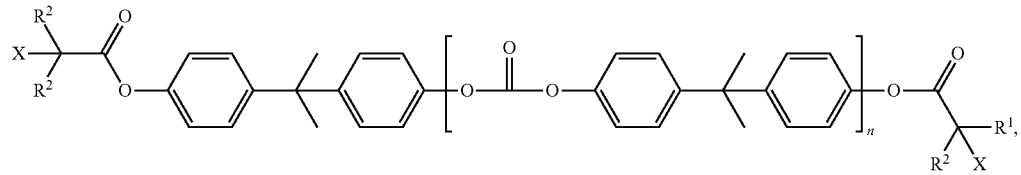

wherein the telechelic polycarbonate macroinitiator has a Mn of about 500 to about 40,000; wherein the telechelic polycarbonate macroinitiator has a Mw of about 1,000 to about 70,000; wherein $R^1$ and $R^2$ are independently selected from methyl, ethyl, propyl, and isopropyl; and wherein X is selected from bromo and chloro. In a still further aspect, X is bromo. In a yet further aspect, X is chloro. In an even further aspect, the telechelic polycarbonate macroinitiator has a Mn of about 3,000 to about 35,000; and wherein the telechelic polycarbonate macroinitiator has a Mw of about 6,000 to about 60,000. In a still further aspect, the telechelic polycarbonate macroinitiator has a Mn of about 10,000 to about 25,000; and wherein the telechelic polycarbonate macroinitiator has a Mw of about 20,000 to about 50,000.

In various aspects, the telechelic polycarbonate macroinitiator has a structure represented by a formula:

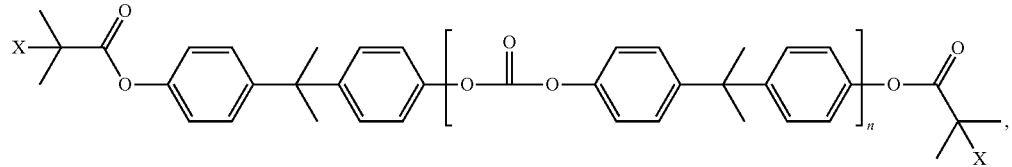

wherein the telechelic polycarbonate macroinitiator has a Mn of about 500 to about 40,000; wherein the telechelic polycarbonate macroinitiator has a Mw of about 1,000 to about 70,000; and wherein X is selected from bromo and chloro. In a still further aspect, X is bromo. In a yet further aspect, X is chloro. In an even further aspect, the telechelic polycarbonate macroinitiator has a Mn of about 3,000 to about 35,000; and wherein the telechelic polycarbonate macroinitiator has a Mw of about 6,000 to about 60,000. In a still further aspect, the telechelic polycarbonate macroinitiator has a Mn of about 10,000 to about 25,000; and wherein the telechelic polycarbonate macroinitiator has a Mw of about 20,000 to about 50,000.

In a further aspect, the telechelic polycarbonate macroinitiator has a structure represented by a formula:

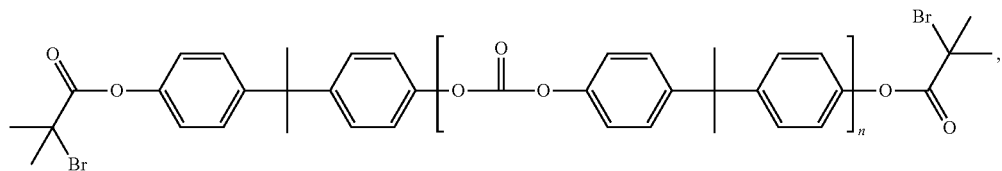

wherein the telechelic polycarbonate macroinitiator has a Mn of about 500 to about 40,000; and wherein the telechelic polycarbonate macroinitiator has a Mw of about 1,000 to about 70,000. In a still further aspect, the telechelic polycarbonate macroinitiator has a Mn of about 3,000 to about 35,000; and wherein the telechelic polycarbonate macroinitiator has a Mw of about 6,000 to about 60,000. In a yet further aspect, the telechelic polycarbonate macroinitiator has a Mn of about 10,000 to about 25,000; and wherein the telechelic polycarbonate macroinitiator has a Mw of about 20,000 to about 50,000.

In a further aspect, the telechelic polycarbonate macroinitiator has a structure represented by a formula:

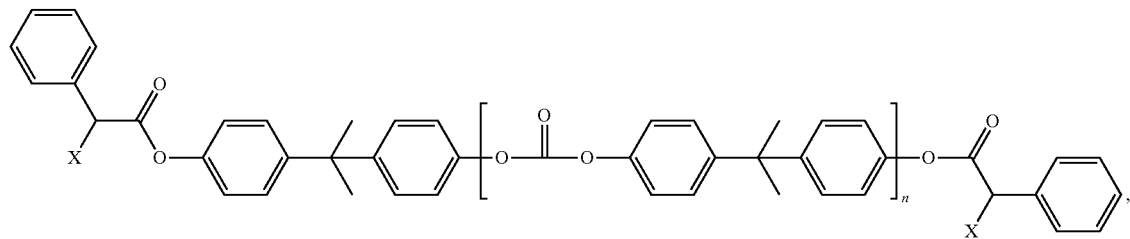

wherein the telechelic polycarbonate macroinitiator has a Mn of about 500 to about 40,000; wherein the telechelic polycarbonate macroinitiator has a Mw of about 1,000 to about 70,000; and wherein X is selected from bromo and chloro. In a still further aspect, X is bromo. In a yet further aspect, X is chloro. In an even further aspect, the telechelic polycarbonate macroinitiator has a Mn of about 3,000 to about 35,000; and wherein the telechelic polycarbonate macroinitiator has a Mw of about 6,000 to about 60,000. In a still further aspect, the telechelic polycarbonate macroinitiator has a Mn of about 10,000 to about 25,000; and wherein the telechelic polycarbonate macroinitiator has a Mw of about 20,000 to about 50,000.

In a further aspect, the telechelic polycarbonate polymer with terminal hydroxyl groups has a structure represented by the formula:

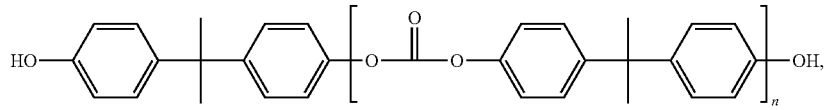

wherein the telechelic polycarbonate polymer has a Mn of about 2,000 to about 35,000; and wherein the telechelic polycarbonate polymer has a Mw of about 3,400 to about 70,000. In a still further aspect, the telechelic polycarbonate polymer has a Mn of about 3,000 to about 30,000; and wherein the telechelic polycarbonate macroinitiator has a Mw of about 6,000 to about 60,000. In a yet further aspect, the telechelic polycarbonate polymer has a Mn of about 5,000 to about 25,000; and wherein the telechelic polycarbonate macroinitiator has a Mw of about 10,000 to about 50,000.

In various aspects, about 1 mol % to about 5 mol % of the telechelic polycarbonate polymer is modified by reaction with the acid halide. In a further aspect, about 1 mol % to about 3 mol % of the telechelic polycarbonate polymer is modified by reaction with the acid halide. In a still further aspect, about 2 mol % to about 3 mol % of the telechelic polycarbonate polymer is modified by reaction with the acid halide.

In a further aspect, reaction with the acid halide yields a telechelic polycarbonate polymer with halo moieties present in about 1 mol % to about 5 mol %. In a still further aspect, reaction with the acid halide yields a telechelic polycarbonate polymer with halo moieties present in about 1 mol % to about 3 mol %. In a yet further aspect, reaction with the acid halide yields a telechelic polycarbonate polymer with halo moieties present in about 2 mol % to about 3 mol %.

In a further aspect, the telechelic polycarbonate polymer with terminal hydroxyl groups has a weight average molecular weight of at least 10,000. In a still further aspect, the telechelic polycarbonate polymer with terminal hydroxyl groups has a weight average molecular weight of at least 20,000. In a yet further aspect, the telechelic polycarbonate polymer with terminal hydroxyl groups has a weight average molecular weight of at least 30,000. In an even further aspect, the telechelic polycarbonate polymer with terminal hydroxyl groups has a weight average molecular weight of about 10,000 to about 50,000. In a still further aspect, the telechelic polycarbonate polymer with terminal hydroxyl groups has a weight average molecular weight of about 20,000 to about 50,000. In a yet further aspect, the telechelic polycarbonate polymer with terminal hydroxyl groups has a weight average molecular weight of about 30,000 to about 50,000.

In a further aspect, the vinyl monomer is selected from methyl methacrylate, acrylate, styrene, and monoethylenically unsaturated nitrile monomer. In a still further aspect, the vinyl monomer is methyl methacrylate. In a yet further aspect, the vinyl monomer is methacrylate. In an even further aspect, the vinyl monomer is styrene. In a still further aspect, the vinyl monomer is acrylonitrile.

In various aspects, the vinyl monomer is methyl methacrylate; and wherein the block copolymer comprises a polycarbonate block and a PMMA block. In a further aspect, the PMMA block is about 1% wt to about 90% wt of the block copolymer composition. In a still further aspect, the PMMA block is about 5% wt to about 90% wt of the block copolymer composition. In a yet further aspect, the PMMA block is about 10% wt to about 90% wt of the block copolymer composition. In an even further aspect, the PMMA block is about 5% wt to about 80% wt, about 5% wt to about 70% wt, about 5% wt to about 60% wt, or about 5% wt to about 50% wt of the block copolymer composition. In a still further aspect, the PMMA block is about 10% wt to about 80% wt, about 10% wt to about 70% wt, about 10% wt to about 60% wt, or about 10% wt to about 50% wt of the block copolymer composition. In a yet further aspect, the PMMA block is about 20% wt to about 95% wt, 20% wt to about 90% wt, 20% wt to about 80% wt, about 20% wt to about 70% wt, about 20% wt to about 60% wt, or about 20% wt to about 50% wt of the block copolymer composition. In an even further aspect, the PMMA block is about 30% wt to about 95% wt, 30% wt to about 90% wt, 30% wt to about 80% wt, about 30% wt to about 70% wt, about 30% wt to about 60% wt, or about 30% wt to about 50% wt of the block copolymer composition. In a still further aspect, the PMMA block is about 40% wt to about 95% wt, 40% wt to about 90% wt, 40% wt to about 80% wt, about 40% wt to about 70% wt, about 40% wt to about 60% wt, or about 40% wt to about 50% wt of the block copolymer composition. In a yet further aspect, the PMMA block is about 1% wt, about 2% wt, about 5% wt, about 7% wt, about 10% wt, about 15% wt, about 20% wt, about 25% wt, about 30% wt, about 35% wt, about 40% wt, about 45% wt, about 50% wt, about 55% wt, about 60% wt, about 65% wt, about 70% wt, about 75% wt, about 80% wt, about 85% wt, about 90% wt, about 95% wt, or about 98% wt of the block copolymer composition. In a still further aspect, the PMMA block is about 60% wt to about 80% wt of the block copolymer composition. In a yet further aspect, the PMMA block is about 45% wt to about 55% wt of the block copolymer composition.

In a further aspect, the block copolymer has a structure represented by a formula:

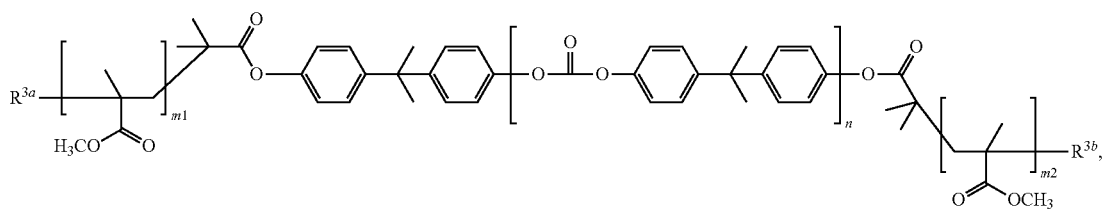

wherein the block copolymer has a Mn of about 500 to about 40,000; and wherein the block copolymer has a Mw of about 1,000 to about 70,000; wherein each of $R^{3a}$ and $R^{3b}$ are independently selected from halogen and hydrogen, provided that the halogen is the same halogen present in the telechelic polycarbonate macroinitiator used in the preparation of the block copolymer. In a still further aspect, the block copolymer has a Mn of about 3,000 to about 35,000; and wherein the block copolymer has a Mw of about 6,000 to about 60,000. In a yet further aspect, the block copolymer has a Mn of about 10,000 to about 25,000; and wherein the block copolymer has a Mw of about 20,000 to about 50,000.

In a further aspect, the block copolymer has a weight average molecular weight from about 15,000 to about 50,000. In a still further aspect, the block copolymer has a weight average molecular weight from about 20,000 to about 50,000. In a yet further aspect, the block copolymer has a weight average molecular weight from about 30,000 to about 50,000. In an even further aspect, the block copolymer has a weight average molecular weight from about 40,000 to about 70,000. In a still further aspect, the block copolymer has a number average molecular weight from about 5,000 to about 30,000. In a yet further aspect, the block copolymer has a number average molecular weight from about 10,000 to about 25,000. In an even further aspect, the block copolymer has a number average molecular weight from about 15,000 to about 30,000. In a still further aspect, the block copolymer has a number average molecular weight from about 20,000 to about 30,000.

In various aspects, the block copolymer has a polydispersity from about 1.7 to about 2.5, from about 1.8 to about 2.3, from about 1.8 to about 2.1, or from about 1.8 to about 1.9.

In a further aspect, the block copolymer has a scratch depth from about 500 nm to about 1000 nm, about 650 nm to about 900 nm, or 700 nm to about 800 nm when tested under a load of 40 mN with a three-sided Berkovich-shaped diamond indenter with a face front of about 0.15 μm.

In a further aspect, the block copolymer has a scratch width from about 10 nm to about 14 nm, about 11 nm to about 13.5, or about 11.5 nm to about 13.5 nm when tested under a load of 40 mN with a three-sided Berkovich-shaped diamond indenter with a face front of about 0.15 μm.

In a further aspect, the catalyst is Cu or a copper salt. In a still further aspect, the catalyst is selected from CuBr, CuCl, $CuCl_2$, and $CuBr_2$. In a yet further aspect, the catalyst is CuBr. In an even further aspect, the catalyst is CuCl. In a still further aspect, the catalyst is $CuCl_2$. In a yet further aspect, the catalyst is $CuBr_2$.

In a further aspect, the optional second initiator is not present and the transition metal catalyst is selected from CuBr, CuCl, $CuCl_2$, $CuBr_2$, and Cu(0). In a yet further aspect, the optional second initiator is not present and the catalyst comprises both Cu(0) and at least one copper salt. In an even further aspect, the optional second initiator is not present and the catalyst comprises both Cu(0) and at least one copper salt selected from CuBr, CuCl, $CuCl_2$, and $CuBr_2$.

In a further aspect, the catalyst ligand is selected from 2,2'-bipyridine, N,N,N',N",N"-pentamethyldiethylenetriamine, diethylenetriamine, triethylenetetramine, N,N-bis(2-pyridylmethyl)amine, tris[2-aminoethyl]amine, 1,4,8,11-tetraazacyclotetradecane, and 1,1,4,7,10,10-hexamethyltriethylenetetramine. In a still further aspect, the catalyst ligand is selected from 2,2'-bipyridine and N,N,N', N",N"-pentamethyldiethylenetriamine. In a yet further aspect, the catalyst ligand is 2,2'-bipyridine. In an even further aspect, the catalyst ligand is N,N,N',N",N"-pentamethyldiethylenetriamine.

In various aspects, the optional second initiator is present. In a further aspect, the second initiator is a peroxide initiator. In a still further aspect, the peroxide initiator is selected from an acyl peroxide, a benzoyl peroxide, an alkyl peroxide, a cumyl peroxide, a tributyl peroxide, a hydroperoxide, a cumyl peroxide, a tributyl hydroxperoxide, a perester, a tributyl perbenzoate, an alkyl sulfonyl peroxide, a dialkyl peroxydicarbonate, a diperoxyketal, and a ketone peroxide. In a yet further aspect, the second initiator is an azo initiator. In an even further aspect, the azo initiator is selected from 1,1'-azobis(cyclohexanecarbonitrile) and 2,2'-azobis(2-methylpropionitrile). In a still further aspect, the azo initiator is 2,2'-azobis(2-methylpropionitrile).

In a further aspect, the molar ratio of vinyl monomer, polycarbonate macroinitiator, catalyst, and catalyst ligand is at least about 25:1:1:1. In a still further aspect, the molar ratio of vinyl monomer, polycarbonate macroinitiator, catalyst, and catalyst ligand is less than about 5000:1:100:200. In a yet further aspect, the molar ratio of vinyl monomer, polycarbonate macroinitiator, catalyst, and catalyst ligand is about 200:1:1:2.5. In an even further aspect, the molar ratio of vinyl monomer, polycarbonate macroinitiator, catalyst, and catalyst ligand is from about 25:1:1:1 to about 5000:1:100:200. In a still further aspect, the molar ratio of vinyl monomer, polycarbonate macroinitiator, catalyst, and catalyst ligand is from about 25:1:1:1 to about 200:1:1:2.5. In a yet further aspect, the atom transfer radical polymerization reaction further comprises Cu(0); and wherein the molar ratio of vinyl monomer, polycarbonate macroinitiator, catalyst, catalyst ligand, and Cu(0) is about 200:1:1:2.5:0.5.

In a further aspect, the molar ratio of vinyl monomer, polycarbonate macroinitiator, catalyst, catalyst ligand and second initiator is at least about 10:1:0.001:0.001:0.1. In a still further aspect, the molar ratio of vinyl monomer, polycarbonate macroinitiator, catalyst, catalyst ligand and second initiator is less than about 1000:1:0.5:0.5:10. In a yet further aspect, the molar ratio of vinyl monomer, polycarbonate macroinitiator, catalyst, catalyst ligand and second initiator is about 200:1:0.05:0.05:0.1. In an even further aspect, the molar ratio of vinyl monomer, polycarbonate macroinitiator, catalyst, catalyst ligand and second initiator is from about 10:1:0.001:0.001:0.1 to about 200:1:0.05:0.05:0.1. In a still further aspect, the molar ratio of vinyl monomer, polycarbonate macroinitiator, catalyst, catalyst ligand and second initiator is from about 10:1:0.001:0.001:0.1 to about 1000:1:0.5:0.5:10.

In a further aspect, the molar ratio of vinyl monomer to polycarbonate initiator is about 25:1, about 50:1, about 100:1, about 125:1, about 150:1, about 175:1, about 200:1, about 225:1, about 250:1, about 275:1, or about 300:1. In a still further aspect, the molar ratio of vinyl monomer to polycarbonate initiator is about 25:1, about 50:1, about 100:1, about 200:1, about 300:1, about 400:1, about 500:1, about 750:1, about 1000:1, about 1500:1, about 2000:1, about 2500:1, about 3000:1, about 3500:1, about 4000:1, about 4500:1, or about 5000:1. In a yet further aspect, the molar ratio of vinyl monomer to polycarbonate initiator is about 25:1. In an even further aspect, the molar ratio of vinyl monomer to polycarbonate initiator is about 50:1. In a still further aspect, the molar ratio of vinyl monomer to polycarbonate initiator is about 150:1. In a yet further aspect, the molar ratio of vinyl monomer to polycarbonate initiator is about 200:1. In an even further aspect, the molar ratio of vinyl monomer to polycarbonate initiator is about 250:1. In a still further aspect, the molar ratio of vinyl monomer to polycarbonate initiator is about 500:1. In a yet further aspect, the molar ratio of vinyl monomer to polycarbonate initiator is about 1000:1. In an even further aspect, the molar ratio of vinyl monomer to polycarbonate initiator is about 2000:1. In a still further aspect, the molar ratio of vinyl monomer to polycarbonate initiator is about 5000:1.

In a further aspect, disclosed are copolymer compositions comprising: a) a polycarbonate domain; wherein the polycarbonate domain has a weight average molecular weight of at least about 3,400; and wherein the polycarbonate domain comprises aromatic carbonate repeating units; and b) a polyacrylate domain comprising repeating units derived from vinyl monomers; wherein the polyacrylate domain is prepared by atom transfer radical polymerization of vinyl monomers in the presence of the telechelic polycarbonate polymer; and wherein the polyacrylate domain comprises of at least about 2 mol % of the copolymer. In a still further aspect, the copolymer is a block copolymer comprising a polycarbonate block and a polyacrylate block.

In a further aspect, the aromatic carbonate repeating units of the polycarbonate domain comprise bisphenol A.

In a further aspect, the polycarbonate domain has a weight average molecular weight of at least 10,000. In a still further aspect, the polycarbonate domain has a weight average molecular weight of at least 20,000. In a yet further aspect, the polycarbonate domain has a weight average molecular weight of at least 30,000. In an even further aspect, the polycarbonate domain has a weight average molecular weight of about 10,000 to about 50,000. In a still further aspect, the polycarbonate domain has a weight average molecular weight of about 20,000 to about 50,000. In a yet further aspect, the polycarbonate domain has a weight average molecular weight of about 30,000 to about 50,000.

In a further aspect, the polyacrylate domain comprises repeating units derived from vinyl monomers selected from methyl methacrylate, acrylate, styrene, and monoethylenically unsaturated nitrile monomer. In a still further aspect, the polyacrylate domain comprises repeating units derived from methyl methacrylate. In a yet further aspect, the polyacrylate domain comprises repeating units derived from methacrylate. In an even further aspect, the polyacrylate domain comprises repeating units derived from styrene. In a still further aspect, the polyacrylate domain comprises repeating units derived from acrylonitrile.

In various aspects, the polyacrylate domain is PMMA. In a further aspect, the polyacrylate domain is PMMA, wherein PMMA is about 10% wt to about 90% wt of the block copolymer composition. In a still further aspect, the polyacrylate domain is PMMA, wherein PMMA is about 40% wt to about 80% wt of the block copolymer composition. In a yet further aspect, the polyacrylate domain is PMMA, wherein PMMA is about 40% wt to about 90% wt of the block copolymer composition. In an even further aspect, the polyacrylate domain is PMMA, wherein PMMA is about 40% wt to about 60% wt of the block copolymer composition. In a still further aspect, the polyacrylate domain is PMMA, wherein PMMA is about 60% wt to about 80% wt of the block copolymer composition. In a yet further aspect, the polyacrylate domain is PMMA, wherein PMMA is about 45% wt to about 55% wt of the block copolymer composition.

In a further aspect, the copolymer composition has a polydispersity from about 1.7 to about 2.5, from about 1.8 to about 2.3, from about 1.8 to about 2.1, or from about 1.8 to about 1.9.

In a further aspect, the copolymer composition has a scratch depth from about 500 nm to about 1000 nm, about 650 nm to about 900 nm, or about 700 nm to about 800 nm when tested under a load of 40 mN with a three-sided Berkovich-shaped diamond indenter with a face front of about 0.15 μm.

In a further aspect, the copolymer composition has a scratch width from about 10 nm to about 14 nm, about 11 nm to about 13.5 nm, or about 11.5 nm to about 13.5 nm when tested under a load of 40 mN with a three-sided Berkovich-shaped diamond indenter with a face front of about 0.15 μm.

In various aspects, the copolymer composition is a block copolymer composition. In a further aspect, the block copolymer composition comprises a polycarbonate block and a polyacrylate block. In a still further aspect, the polycarbonate block is derived from a telechelic polycarbonate macroinitiator. In a yet further aspect, the telechelic polycarbonate macroinitiator has a formula:

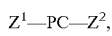

wherein PC is a polycarbonate polymer comprising aromatic carbonate repeating units;
wherein $Z^1$ and $Z^2$ have a formula:

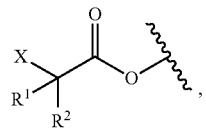

wherein $R^1$ is selected from hydrogen, C1-C6 alkyl, —(C1-C6 alkyl)-aryl, and aryl; wherein $R^2$ is selected from C1-C6 alkyl, —(C1-C6 alkyl)-aryl, and aryl; and wherein X is halogen.

In one aspect, polycarbonate-polyacrylate copolymers of the present invention can be prepared generically by the synthetic scheme as shown below.

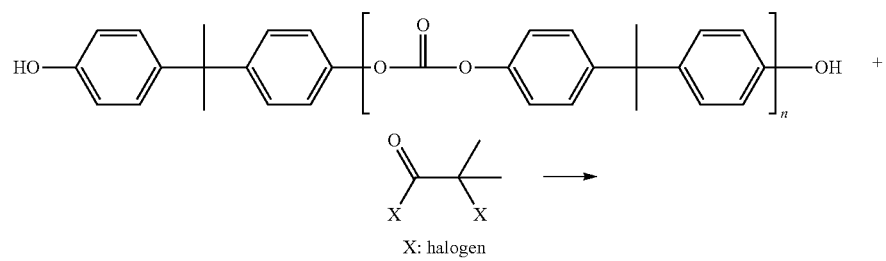

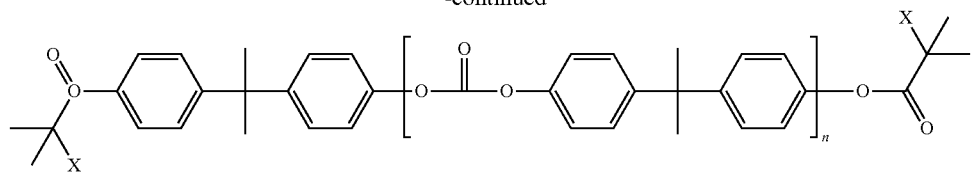

Compounds are represented in generic form, with substituents as noted in compound descriptions elsewhere herein. A more specific example is set forth below.

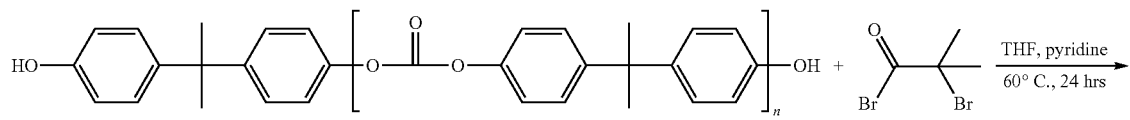

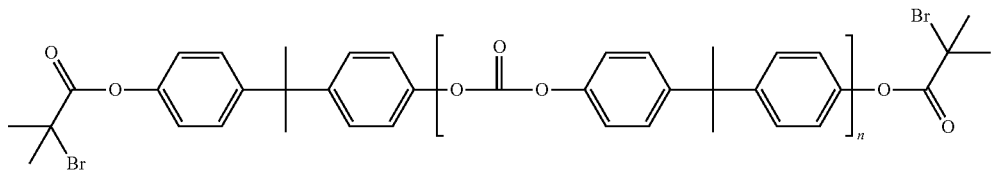

In one aspect, polycarbonate-polyacrylate copolymers of the present invention can be prepared generically by the synthetic scheme as shown below.

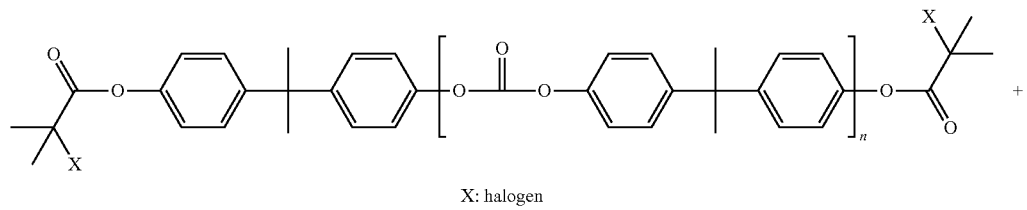

X: halogen

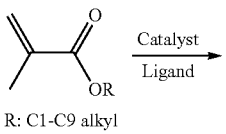

R: C1-C9 alkyl

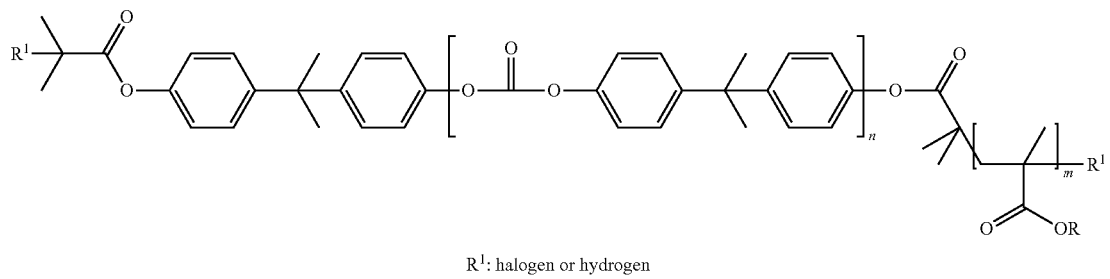

$R^1$: halogen or hydrogen

Compounds are represented in generic form, with substituents as noted in compound descriptions elsewhere herein. A more specific example is set forth below.

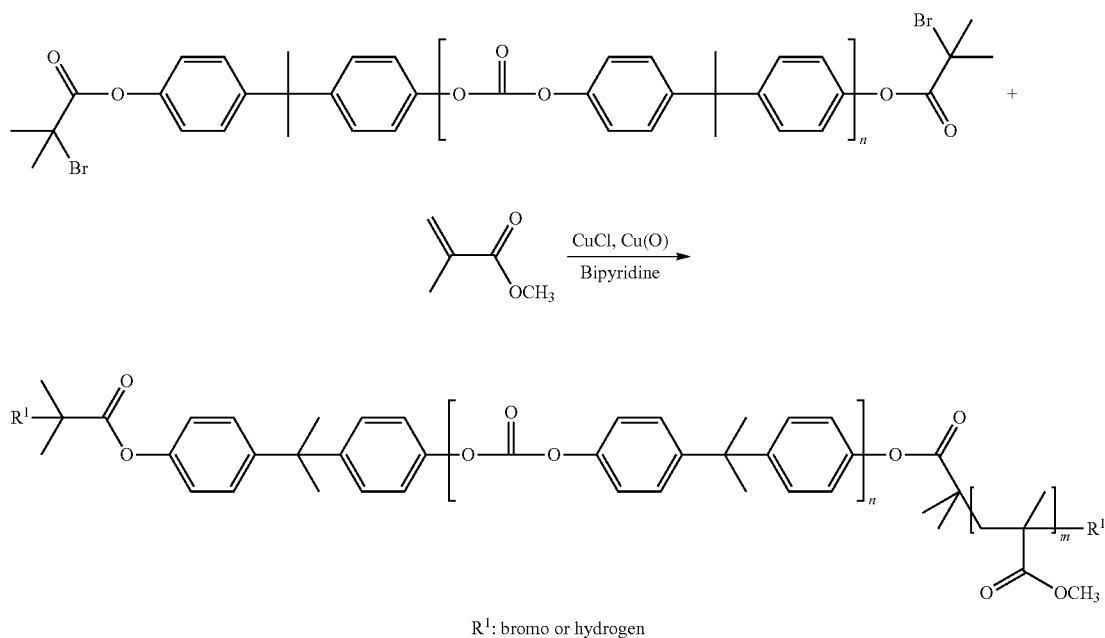
In one aspect, polycarbonate-polyacrylate copolymers of the present invention can be prepared generically by the synthetic scheme as shown below.
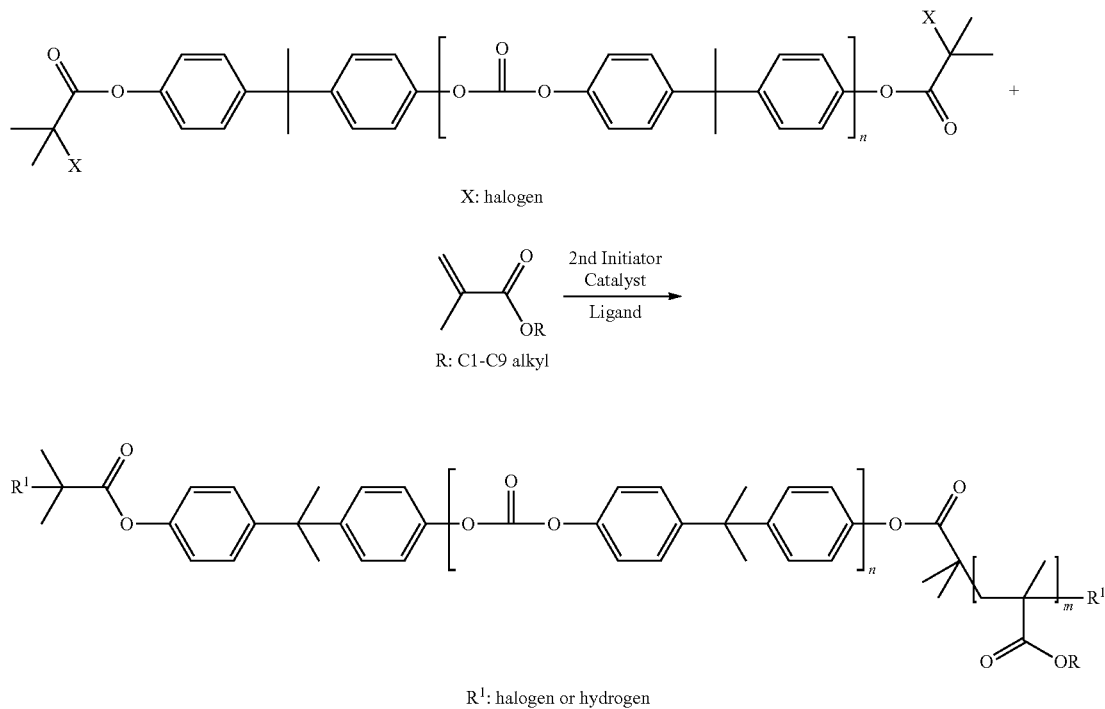
Compounds are represented in generic form, with substituents as noted in compound descriptions elsewhere herein. A more specific example is set forth below.

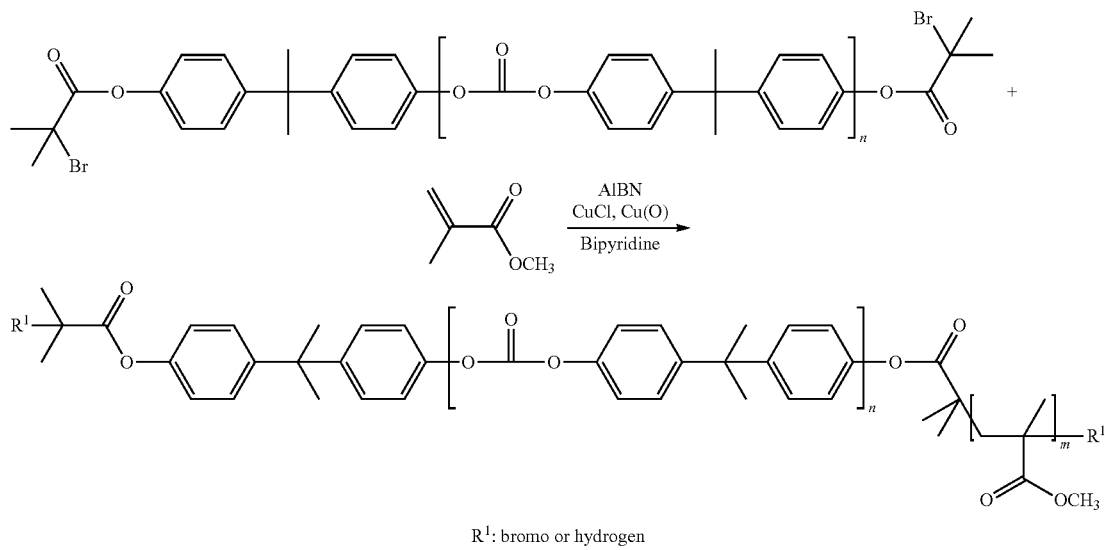

R¹: bromo or hydrogen

Polycarbonate Polymer Compositions

As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In one aspect, non-limiting examples of suitable bisphenol compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4-(4'-(1,1-bis(p-hydroxyphenyl)-ethyl)alpha,alpha-dimethylbenzyl)phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters).

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, from about 8 to about 10.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate ($HS^-$), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediaminetetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Although commercial polycarbonate polymers are commonly prepared with end-capping agents, and such polycarbonate polymers can be used in the preparation of the copolymer compositions of the present invention. Alternatively, the preparation of a polycarbonate polymer for use in the present invention can minimize or eliminate the use of such end-capping agents so that the presence of available hydroxyl (—OH) groups is maximized.

In various aspects, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. It is common for commercial polycarbonate polymers to comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. However, such derivitization of endgroups can be eliminated, if desired, in preparing the polycarbonate polymers of the present invention in order to maximize the presence of hydroxyl endgroups in the polycarbonate polymer.

In a further aspect, the hydroxyl (—OH) end-group can be varied and optimized in the polycarbonate polymers used in the copolymer compositions of the present invention. For example, in standard commercial processes, in a reaction to prepare a polycarbonate comprising diphenyl carbonate ("DPC") and bisphenol A, an excess of DPC is commonly used. Alternatively, a polycarbonate that is prepared for use in the copolymer compositions of the present invention can be prepared in a reaction wherein a lower ratio of DPC:BPA is used, thereby resulting in an increase in hydroxyl end-groups. An increase in the relative number of the hydroxyl end-groups per polycarbonate chain can be advantageous for the preparation of the copolymers of the present invention. Desired polycarbonates with appropriate hydroxyl (—OH) end-groups can be prepared by using activated carbonates using methods as described in U.S. Pat. No. 7,482,423, hereby incorporated by reference in its entirety.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of phenol or ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In addition to the polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

In other aspects, a polycarbonate composition can comprise one or more of an antioxidant, for instance, phosphorous containing stabilizers and hindered phenols, flame retardant, heat stabilizer, light stabilizer, UV absorbing additive, plasticizer, lubricant, mold release agent, antistatic agent, colorant (e.g., pigment and/or dye), or a combination thereof.

The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Thermoplastic compositions comprising blended polycarbonate compositions can be manufactured by various methods. For example, powdered polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Atom Transfer Radical Polymerization (ATRP)

"Controlled/living" radical polymerization (CRP) has become one of the robust and powerful techniques for polymer synthesis, during the past decade. CRP can be achieved by creation of a dynamic equilibrium between a dormant species and propagating radicals via reversible deactivation or chain transfer procedures. This goal can be achieved by several recently developed controlled polymerization techniques which include stable free-radical polymerization (SFRP) predominately nitroxide mediated polymerization (NMP), atom transfer radical polymerization (ATRP), reversible addition-fragmentation chain transfer polymerization (RAFT), and Te, Sb, and Bi-mediate polymerization, reversible chain transfer catalyzed polymerization.

Matyjaszewski and coworkers disclosed the fundamental four component Atom Transfer Radical Polymerization (ATRP) process comprising the addition, or in situ formation, of an initiator, in this case a molecule with a transferable atom or group that is completely incorporated into the final product, a transition metal and a ligand that form, a partially soluble transition metal complex that participates in a reversible redox reaction with the added initiator or a dormant polymer to form the active species to copolymerize radically polymerizable monomers, and a number of improvements to the basic ATRP process, in a number of commonly assigned patents and patent applications: U.S. Pat. Nos. 5,763,546; 5,807,937; 5,789,487; 5,945,491; 6,111,022; 6,121,371; 6,124,411; 6,162,882; 6,624,262; 6,407,187; 6,512,060; 6,538,091; 6,541,580; 6,624,262; 6,627,314; 6,759,491; 6,790,919; 6,887,962; 7,019,082; 7,049,373; 7,064,166; 7,125,938; 7,157,530; 7,332,550 and U.S. patent application Ser. No. 09/534,827; PCT/US04/09905; PCT/US05/007264; PCT/US05/007265; PCT/US06/33152; PCT/US2006/048656 and PCT/US08/64710, all of which are herein incorporated by reference.

ATRP is one of the most efficient CRP methods for the preparation of pure segmented copolymers, since it does not require addition of a radical initiator to continuously form new polymer chains, allowing the synthesis of novel multi-segmented copolymers with a predetermined degree of polymerization, low molecular weight distribution ($M_w/M_n$), incorporating a wide range of functional monomers and displaying controllable macromolecular structures under mild reaction conditions. ATRP generally requires addition of formation or an alkyl halide or (pseudo)halide as an initiator (R—X) or dormant polymer chain end (Pn—X), and a partially soluble transition metal complex (e.g. Cu, Fe or Ru) capable of undergoing a redox reaction as a catalyst. As shown in Scheme 1 ATRP involves homolytic cleavage of the Pn—X bond by a transition metal complex ($M_t^n$—Y/Ligand), with a rate constant $k_a$, followed by propagation, with rate constant $k_p$, and reversible deactivation of the propagating chain radical (Pn*), with a rate constant $k_d$, by repetitive transfer of the halogen or pseudo-halogen atom from and to the transition metal complex. The polymer grows by insertion of the monomer(s) present in the reaction medium between the $P_n$— and —X bond.

Scheme 1

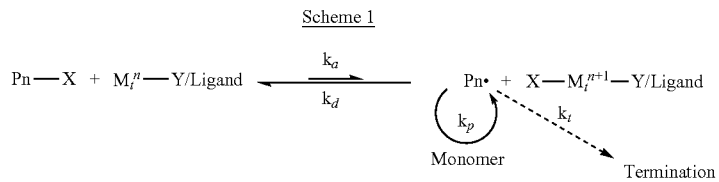

Articles

In various aspects, the disclosed copolymer compositions of the present invention are suitable for use in molding articles. In a further aspect, the disclosed copolymer compositions of the present invention are suitable for use in film casting to provide articles. In a still further aspect, the disclosed copolymer compositions of the present invention are suitable for use in coating processes to provide articles.

In a further aspect, the disclosed methods of preparing a copolymer can be used to prepare a copolymer that is used in molding articles. In a still further aspect, the disclosed methods of preparing a copolymer can be used to prepare a copolymer that is used in film casting to provide articles. In a still further aspect, the disclosed methods of preparing a copolymer can be used to prepare a copolymer that is used in coating processes to provide articles.

The molded articles can be compression molded, injection molded, blow molded, injection-blow-molded, or extruded. The article can also be a solid sheet, an extruded multi-wall sheet, a cast film, or an extruded film. The article can also be a multi-layered article where a capping layer or outer layer is made from the copolymer composition to take advantage of the surface properties of the copolymer composition. Such multi-layered articles include a co-extruded solid sheet, a co-extruded multi-wall sheet, a co-extruded film, or a film cast onto a separately molded part. Alternatively, the multi-layered article may be made by molding a different resin onto a film made from the copolymer composition. Examples of such applications may include optical lenses or bezels. Multi-layer articles may be useful in consumer electronic products. In a further aspect, a method of manufacturing an article comprises melt blending the copolymer composition with additives appropriate for the manufacture of the article, e.g. anti-static agents, mold release agents, and colorants; and molding the extruded composition into an article. In a still further aspect, the extruding is done with a single screw extruder or a twin screw extruder.

In a further aspect, the article comprising the disclosed copolymer compositions is used in automotive applications. In a still further aspect, the article can be selected from computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like. Other representative articles that may be fabricated using the disclosed copolymer compositions provided herein include headlamp bezels, headlamps, tail lamps, tail lamp housings, tail lamp bezels, license plate enclosures, enclosures for electrical and telecommunication devices, building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; and like applications. In a still further aspect, the article used in automotive applications is selected from instrument panels, overhead consoles, interior trim, center consoles, headlamp bezels, headlamps, tail lamps, tail lamp housings, tail lamp bezels, license plate enclosures, steering wheels, radio speaker grilles, mirror housings, grille opening reinforcements, steps, hatch covers, knobs, buttons, and levers. Additional fabrication operations may be performed on articles, such as, but not limited to molding, in-mold decoration, baking in a paint oven, lamination, and/or thermoforming.

In various aspects, the article comprising the disclosed copolymer compositions are suitable for use in applications such as transparent keypads for mobile phones, where customers require the possibility to form these films at low temperatures (below 100° C.) and further require an improved punch ductility and chemical resistance. Other typical such articles are automotive trim, automotive interior parts, portable telecommunications and appliance fronts. In a further aspect, wherein the article is a film, it can further comprise visual effects pigments (such as coated Al and glass flakes. In a still further aspect, the article is a film comprising a disclosed copolymer composition can be used in direct film applications but also in processes like IMD (In Mould Decoration). In an even further aspect, the article comprising a disclosed copolymer composition is used in lighting applications including automotive headlamp lenses, covers and lenses for other optical devices, as well as transparent films and sheets. The article can also be used in a wide variety of molded products such as medical devices, radio and TV bezels, mobile phone keypads, notebook computer housings and keys, optical display films, automotive parts, and other electronic and consumer products.

Shaped, formed, or molded articles comprising the thermoplastic compositions are also provided. The thermoplastic compositions may be molded into useful shaped articles by a variety of methods such as injection molding, extrusion, rotational molding, blow molding and thermoforming. Alternatively, as required for the efficient and usual manufacture of the desired article, film casting and coating can be used to form the article. The foregoing methods, as appropriate, can be used to form or fabricate articles such as, for example, computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, headlamp bezels, headlamps, tail lamps, tail lamp housings, tail lamp bezels, license plate enclosures, enclosures for electrical and telecommunication devices, building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; instrument panels, overhead consoles, interior trim, center consoles, headlamp bezels, headlamps, tail lamps, tail lamp housings, tail lamp bezels, license plate enclosures, steering wheels, radio speaker grilles, mirror housings, grille opening reinforcements, steps, hatch covers, knobs, buttons, and levers. Alternatively, as required for the efficient and usual manufacture of the desired article, film casting and coating can be used to form the article.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

The materials shown in Table 1 were used to prepare the compositions described herein.

TABLE 1

| Abbreviation | Description | Source |
|---|---|---|
| PC1 | BisPhenol A polycarbonate resin prepared by an interfacial process with a Mw of about 10,000, and a Mn of about 5,000. | SABIC Innovative Plastics ("SABIC IP") |
| PC2 | BisPhenol A polycarbonate resin prepared by an interfacial process with a Mw of about 22,500 to about 33,000, and a Mn of about 11,700 to about 15,700. | SABIC-IP |
| MMA | Methyl methacrylate | Sigma-Aldrich Corporation ("Aldrich") |
| Cu(II)Br$_2$ | — | Aldrich |
| Cu(I)Br | — | Aldrich |
| Cu(I)Cl | — | Aldrich |
| Cu(0) | — | Aldrich |
| PMDETA | N,N,N',N'',N''-pentamethyldiethylenetriamine | Aldrich |
| BrBBr | 2-Bromoisobutyryl bromide | Aldrich |
| Bpy | 2,2'-bipyridine | Aldrich |
| AIBN | azobisisobutyronitrile | Aldrich |

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Standard Test Methods

Samples were also tested for scratch resistance using a with a Nano Indenter® G200 (Agilent Technologies, Santa Clara, Calif.). A three-sided Berkovich-shaped diamond indenter (face front, ~0.15 μm diameter) was used to scratch the material surface. A typical scratch experiment was performed in four stages; an original profile, a scratch segment, a residual profile and a cross profile. Test parameters used in this study are shown below in the Table 2. Data obtained using the scratch resistance test method are given in Tables 5 and 8.

TABLE 2

| Parameter | Value |
|---|---|
| Maximum Load | 40 mN and 120 mN |
| Profile at | 16 mN and 48 mN |
| Scratch velocity | 10 μm/s |
| Scratch Length | 500 μm |
| Profile Load | 50 μN |

The transparency, haze, and clarity properties of films prepared from the copolymers disclosed herein were also determined per ASTM International Designation: D 1003-00, "Standard Test Method for Haze and Luminous Transmittance of Transparent Plastics," published July, 2000 on 2.5 millimeter thick molded plaques. A on Haze-Gard Dual from BYK-Gardner was used to make the measurements. As a general rule, light transmission percentages over 85 are considered to be 'transparent'. The copolymers disclosed herein had the following properties: transparency was 87-90%; haze was 9-14%; and clarity was 98-99% as measured according to ASTM D1003.

Preparation of Polycarbonate Macroinitiator

Figure 2:
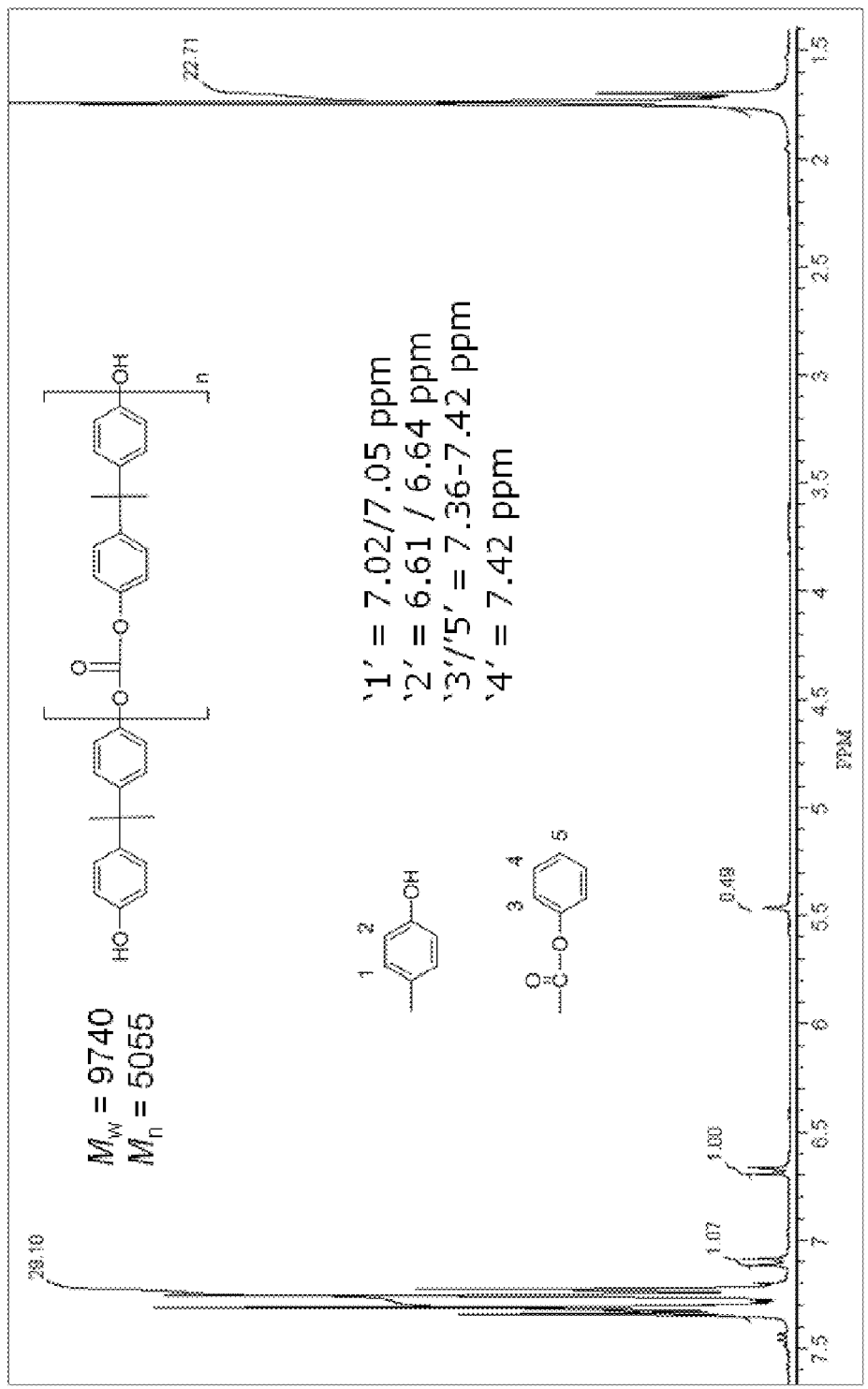
FIG. 2 shows a representative $^1$H NMR of a representative polycarbonate oligomer used to prepare a representative telechelic polycarbonate macroinitiator.

The polycarbonate macroinitiator was prepared from PC1, a bisphenol A polycarbonate described in Table I. In general, PC1 has a Mw of about 10,000 and a Mn of about 5,000. A representative $^1$H-NMR trace for PC1 is shown in FIG. 2. In this experiment, PC1 had a Mw of 9,740 and a Mn of 5,055.

Briefly, 2-bromoisobutyryl bromide (1.64 g, 7.2 mmol) was dissolved in THF (3 mL). The PC1 (20 g, 2.0 mmol) was dissolved in THF (20 mL) with heating at 60° C. The 2-bromoisobutyryl bromide solution was added dropwise to the solution of PC1, then 0.56 g pyridine (in 4 mL THF) was added dropwise, and the reaction mixture was allowed to react at 60° C. for about 24 h. The contents were then cooled; the reaction mixture was precipitated in methanol, filtered and washed with methanol several times to remove any unreacted material. The isolated polycarbonate macroinitiator was then dried at 50° C. under reduced pressure to yield the polycarbonate macroinitiator, and is called "PC1-Min" hereinafter.

Figure 3:
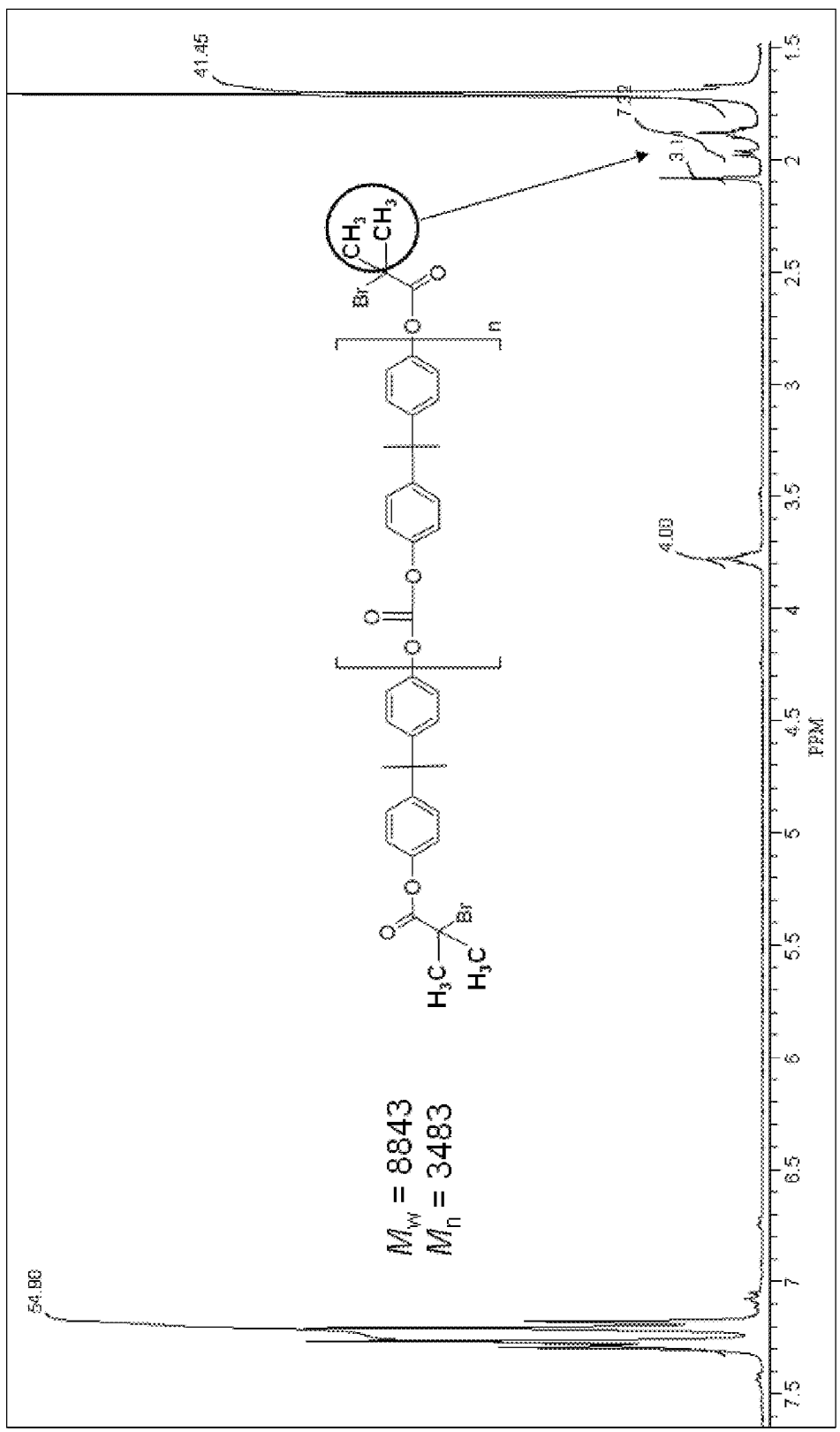
FIG. 3 shows a representative $^1$H NMR of a representative haloester polycarbonate oligomer used to prepare a representative telechelic polycarbonate macroinitiator.

$^1$H-NMR analysis was carried out on PC1-Min and the data are shown in FIG. 3. The isolated PC1-Min had a slightly decreased Mw and Mn (8,843 and 3,483, respectively) compared to PC 1 prior to reaction with 2-bromoisobutyryl bromide.

Figure 7:
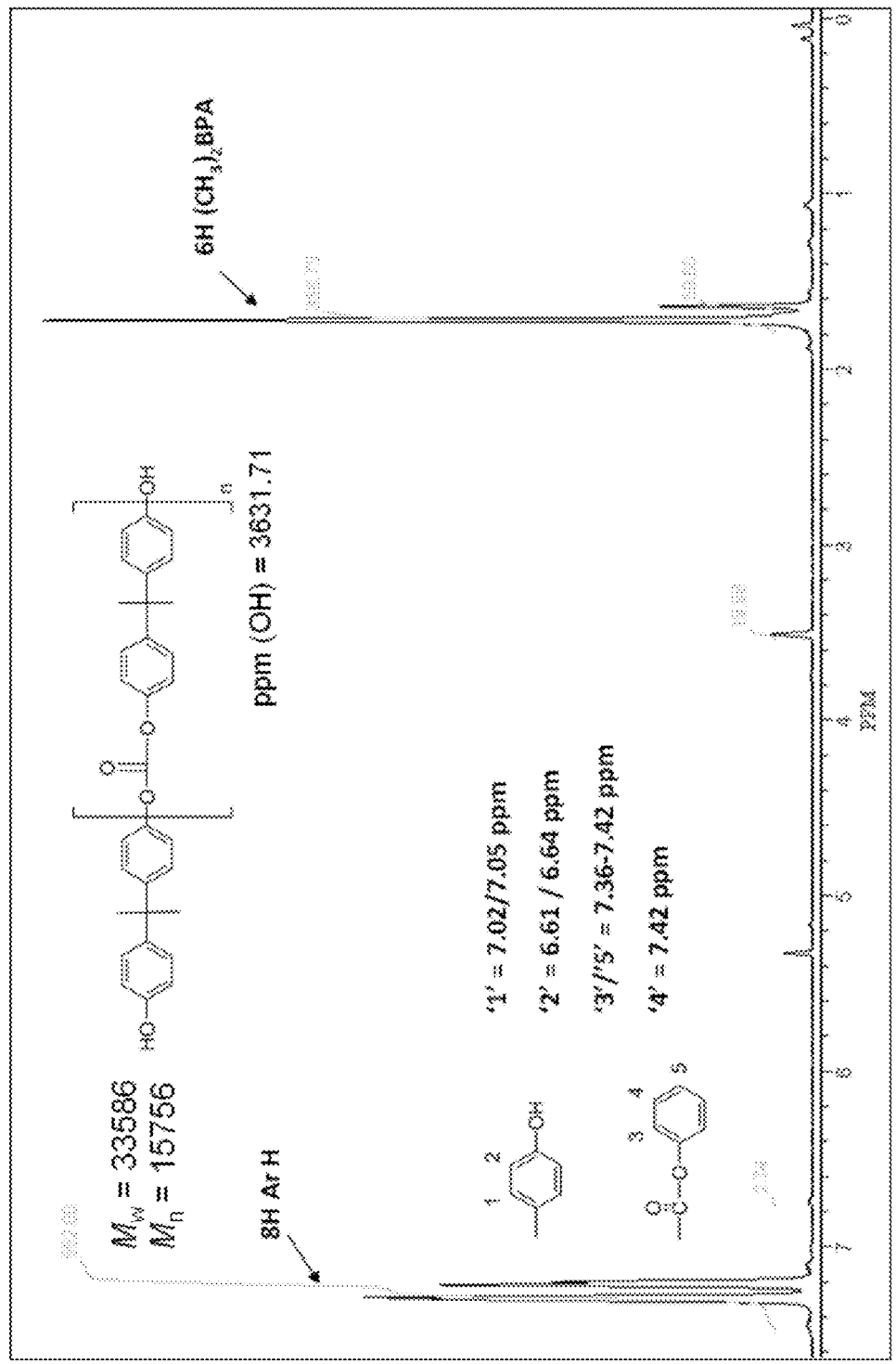
FIG. 7 shows a representative $^1$H NMR of a representative polycarbonate polymer used to prepare a representative telechelic polycarbonate macroinitiator.

Alternatively, the polycarbonate macroinitiator was prepared from PC2, a polycarbonate polymer described in Table I. PC2 has a Mw of about 22,500 to about 33,000 and a Mn of about 11,700 to about 15,700. A representative $^1$H-NMR trace for PC1 is shown in FIG. 7. In this experiment, PC2 had a Mw of 33,586, a Mn of 15,756, and ppm (OH) of 3363.71. Phenolic hydroxyl groups were quantified by using $^{31}$P NMR and data used to determine the "ppm (OH)," wherein 1 ppm indicates 1 mg of phenolic hydroxyl groups per 1 kg of polycarbonate polymer.

Figure 8:
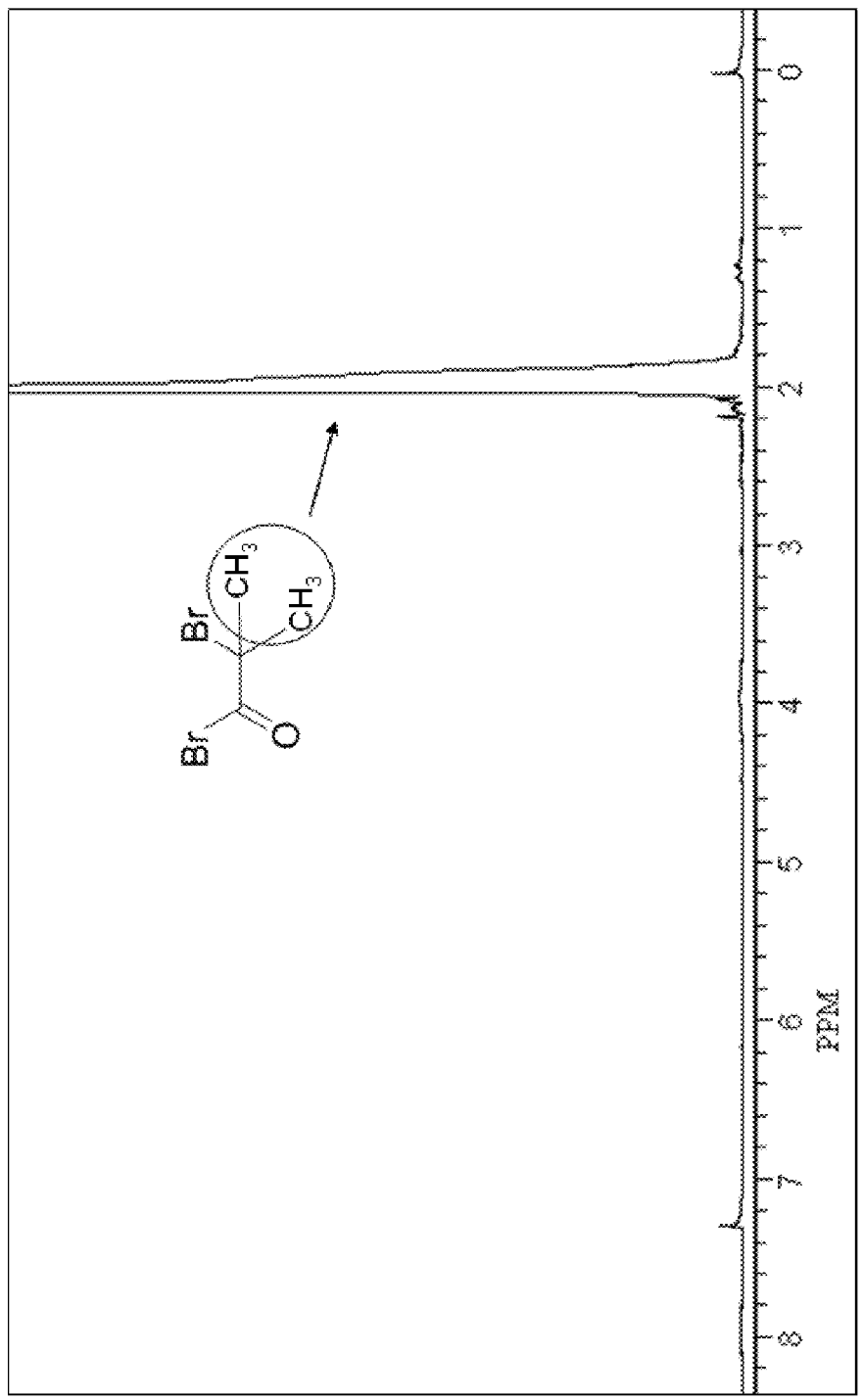
FIG. 8 shows a representative $^1$H NMR of 2-Bromoisobutyryl bromide.

Briefly, 2-bromoisobutyryl bromide (4.00 g, 17.6 mmol) was dissolved in THF (15 mL). A representative $^1$H-NMR trace for 2-bromoisobutyryl bromide is shown in FIG. 8. The PC2 (20 g, 0.5 mmol) was dissolved in THF (200 mL) with heating at 60° C. The 2-bromoisobutyryl bromide solution was added dropwise to the solution of PC2, then 1.50 g pyridine (in 10 mL THF) was added dropwise, and the reaction mixture was allowed to react at 60° C. for about 21 h. The contents were then cooled; the reaction mixture was precipitated in methanol, filtered and washed with methanol several times to remove any unreacted material. The isolated polycarbonate macroinitiator was then dried at about 50° C. under reduced pressure for about 5-6 hr to yield the polycarbonate macroinitiator, and is called "PC2-Min" hereinafter. The content of bromo groups in a representative batch of polycarbonate macroinitiator prepared by this method was about 2.7 mol %.

Figure 9:
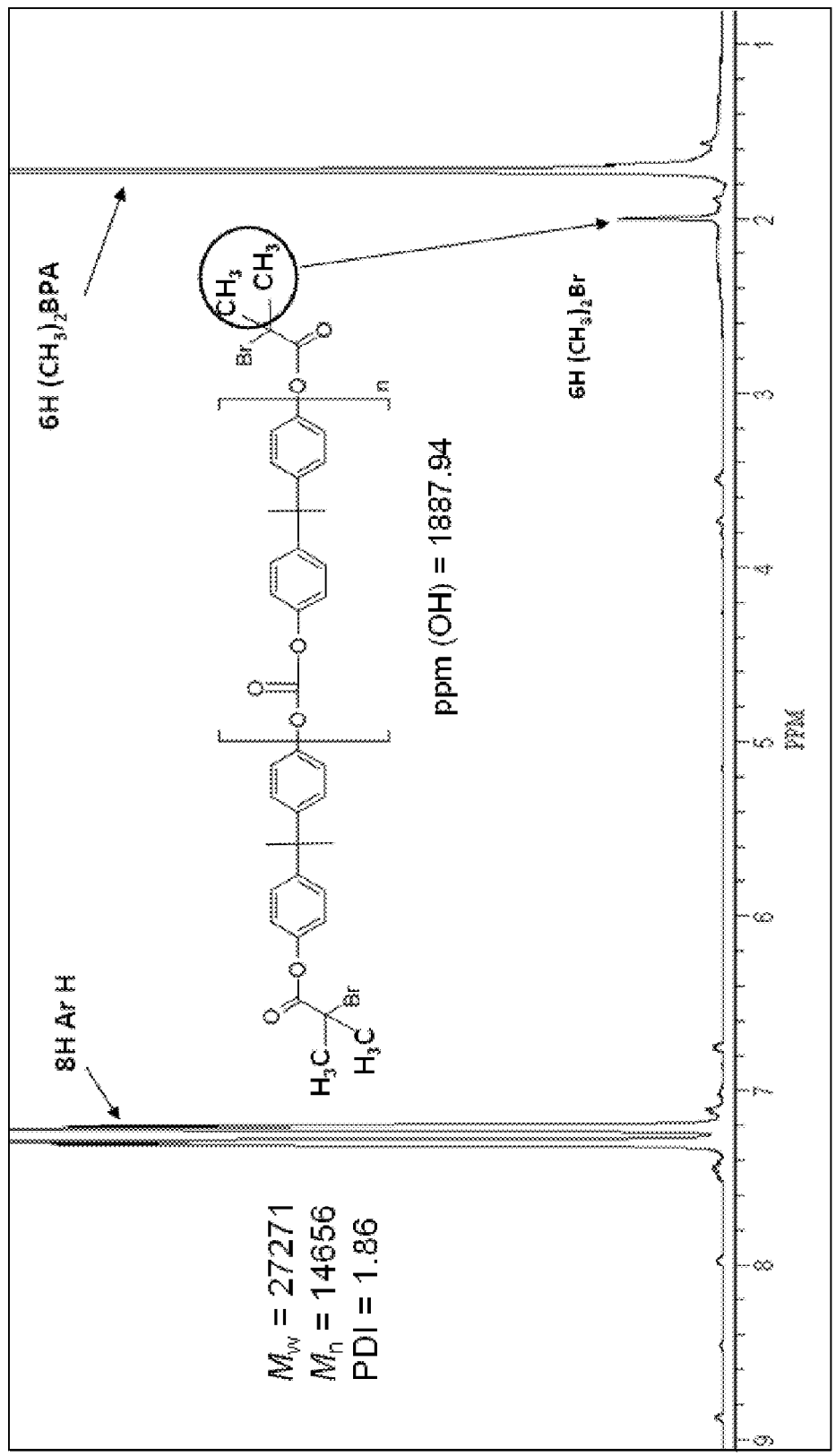
FIG. 9 shows a representative $^1$H NMR of a representative haloester polycarbonate polymer used to prepare a representative telechelic polycarbonate macroinitiator.
Figure 10:
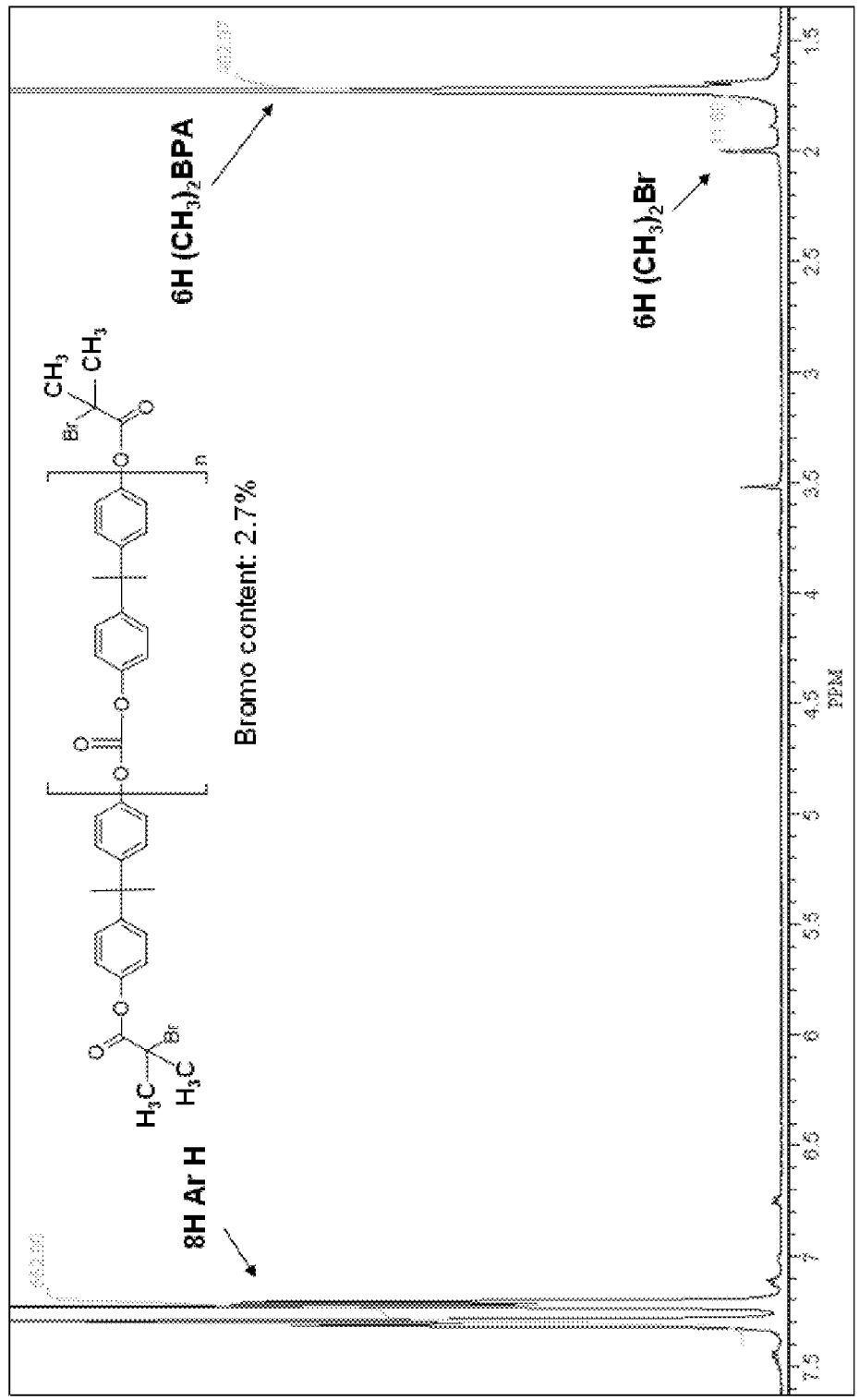
FIG. 10 shows a representative $^1$H NMR of a representative haloester polycarbonate polymer following vacuum drying.
Figure 11:
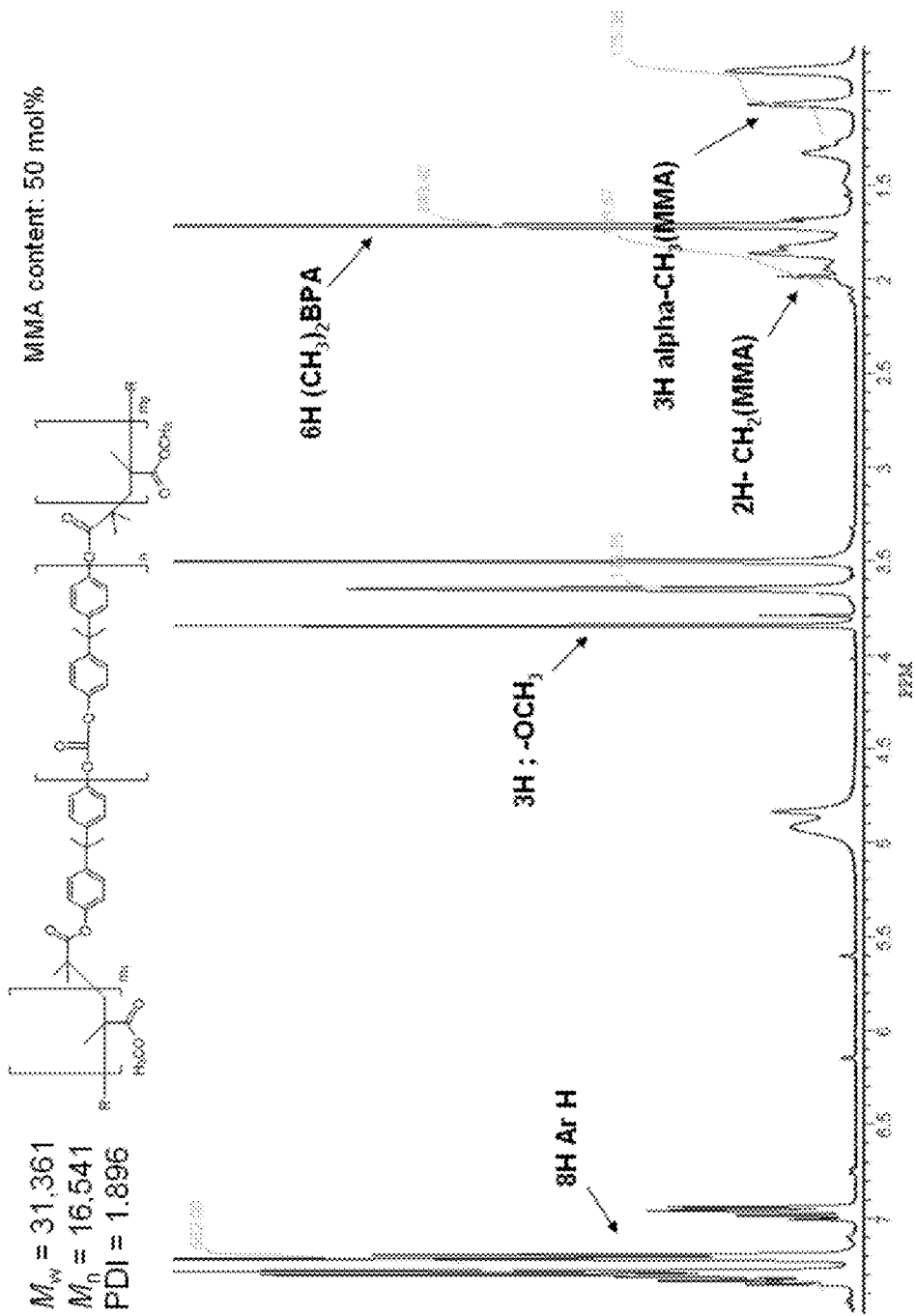
FIG. 11 shows a representative $^1$H NMR of a representative disclosed polycarbonate-PMMA copolymer.
Figure 12:
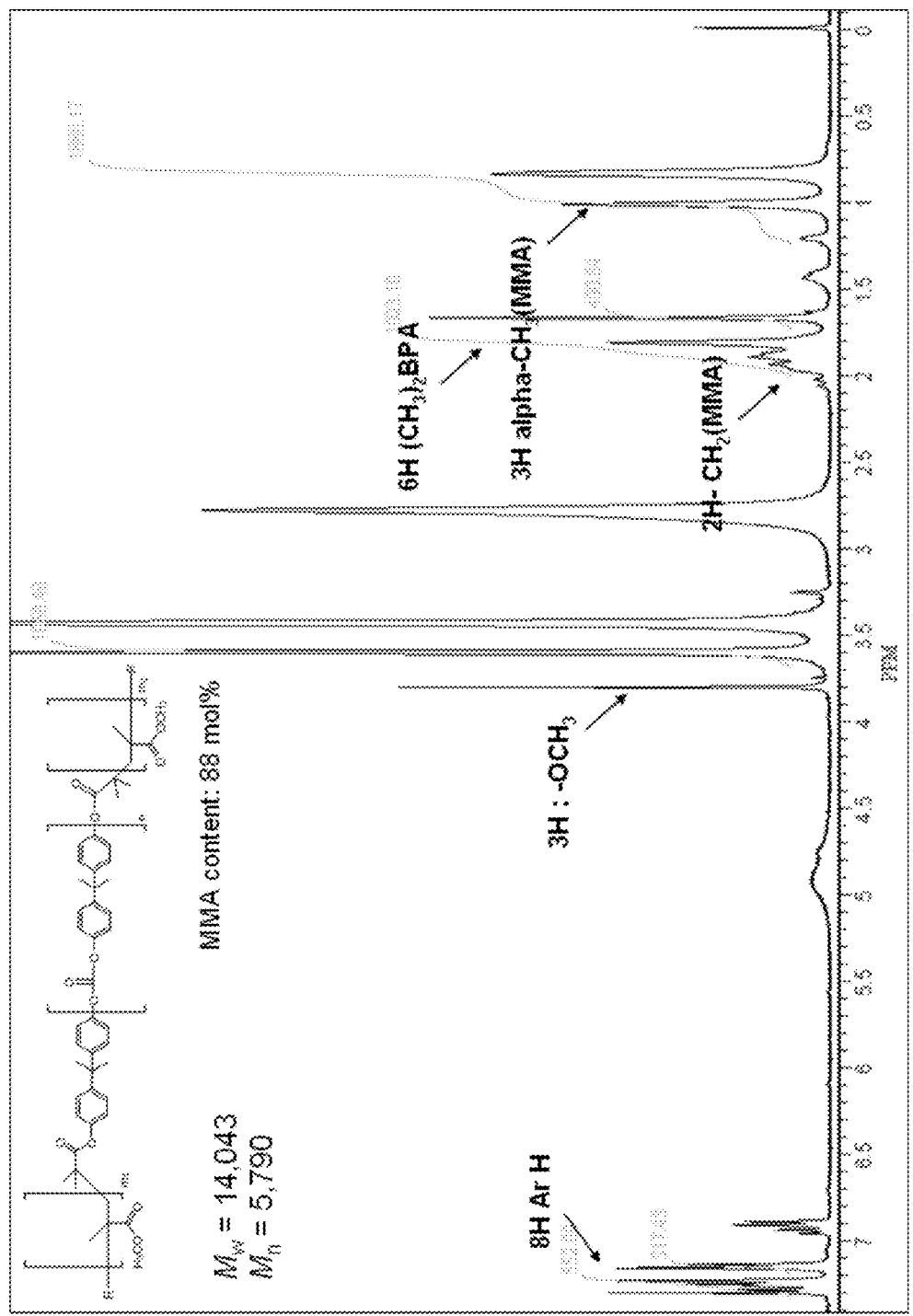
FIG. 12 shows a representative $^1$H NMR of a representative disclosed polycarbonate-PMMA copolymer.

$^1$H-NMR analysis was carried out on PC2-Min prior to vacuum drying and the data are shown in FIG. 9, and $^1$H-NMR analysis was carried out on PC2-Min after vacuum drying and the data are shown in FIG. 10. The isolated PC2-Min had a slightly decreased Mw and Mn (27,271 and 14,656, respectively) compared to PC2 prior to reaction with 2-bromoisobutyryl bromide. The ppm (OH) of the PC2-Min was 1887.94. As anticipated, this value had decreased compared to PC2 starting material due to reaction of 2-bromoisobutyryl bromide with phenolic hydroxyl groups of PC2.

It should be noted that the polycarbonate polymer used in the preparation of PC2-Min was purified of additives and contaminants prior to use in the reaction described above, except as noted below for the APM3 batch. Briefly, polycarbonate pellets were dissolved in dichloromethane and the polycarbonate polymer precipitated from solution with methanol, thereby yielding a purified white powder. The precipated polycarbonate polymer was then dried under reduced pressure at about 50° C. for about 5-6 hr to remove any residual methanol.

Mn and Mw were determined using data obtained by standard chromatographic procedures. Briefly, GPC was carried out by first dissolving the sample at 1 mg/ml concentration in dichloromethane. The sample was then analyzed by GPC using a Polymer Laboratories MiniMIX C column (Polymer Laboratories, a division of Varian, Inc., Amherst, Mass.) with a mobile phase of dichlormethane and a flow rate of 0.3 ml/min. Detection wavelength was 254 nm. Mw results were reported against polystyrene standards. GPEC analysis was also performed. Briefly, samples were prepared at 5 mg/ml in THF and 5 ul was injected onto a HPLC (flow rate was 1 ml/min). Gradient separation was applied from 100% methanol to 100% THF over 20 minutes and returning to 100% methanol. The column was a GraceSmart RP C18 5 μm, 150 mm×4.6 mm (Mandel Scientific Company, Guelph, Ontario, Canada). Detection was by ELSD and DAD-UV. Peaks were identified by comparison with polymer standards.

Copolymer Batches

Representative copolymers were prepared by ATRP using the reactants as shown in Tables 2 and 5, for copolymer batches prepared using PC1-Min and PC2-Min, respectively. The values given under each batch are the amount of each item in grams that was used in the indicated batch, unless otherwise indicated (e.g. the solvents, anisole or toluene, are given in mL). The reaction time and temperature for the indicated batch was as indicated in Tables 2 and 5. Specific notes regarding each preparation is as given below.

Briefly, the PC macroinitiator was dissolved in degassed anisole in a nitrogen purged reaction vessel, e.g. a round-bottom flask. The solution was stirred for several minutes, and then the MMA, catalyst, and ligand were added in the amounts indicated in Tables 2 and 5. The solution was stirred for about 10 minutes to allow formation of the Cu-ligand complex, which had a red color. The reaction was then heated at the indicated temperature, e.g. in an oil bath, for the indicated time (see Tables 2 and 5). In some batches, fowing reaction, the reaction mixture was diluted with chloroform and passed through a neutral alumina column to remove residual catalyst. The solution obtained was concentrated and precipitated in an excess of methanol, then dried under vacuum at 40° C. until constant weight was reached.

Batch APM1

Figure 4:
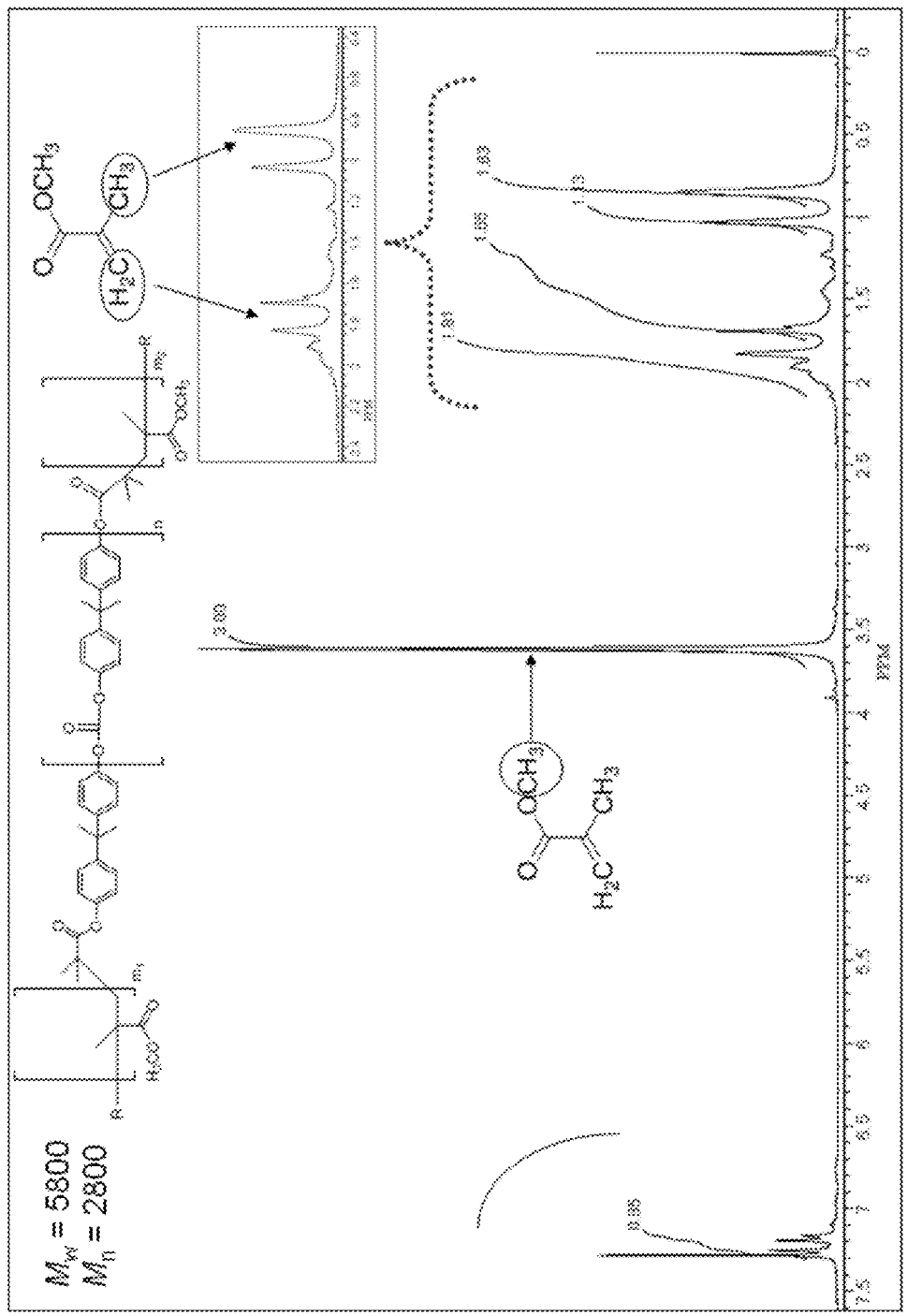
FIG. 4 shows a representative $^1$H NMR of a representative disclosed polycarbonate-PMMA copolymer.

Batch APM1 was prepared as described in Table 3. The resultant copolymer was slightly colored (greenish tinge). A representative $^1$H NMR trace of the resultant copolymer is shown in FIG. 4. The PMMA content of the copolymer was estimated to be about 50 mol % from these $^1$H NMR data. Briefly, the characteristic —OCH$_3$ (3H) peak (see FIG. 4) associated with PMMA and determining the ratio of this peak to integrated signal for the aromatic hydrogens of polycarbonate (i.e., the 8H Ar H peak shown in FIG. 4). Size characteristics of the APM1 copolymer are shown in Table 4 below.

TABLE 3

| | | Batch* | |
|---|---|---|---|
| # | Item | APM1 | APM2 |
| 1 | MMA | 1.78 | 1.79 |
| 2 | PC1-Min | 2.00 | 2.00 |
| 3 | Bpy | — | 0.28 |
| 4 | PMDETA | 0.139 | — |
| 5 | CuBr | 0.057 | — |
| 6 | CuCl | — | 0.07 |
| 7 | Toluene | 3.00 | — |
| 8 | Anisole | — | 3.00 |
| | Temperature (° C.) | 110 | 110 |
| | Reaction time (h) | 21 | 24 |

*All component amounts given in as weight amount (g), except anisole and toluene which are given as volume amounts (mL).

Batch APM2

Figure 5:
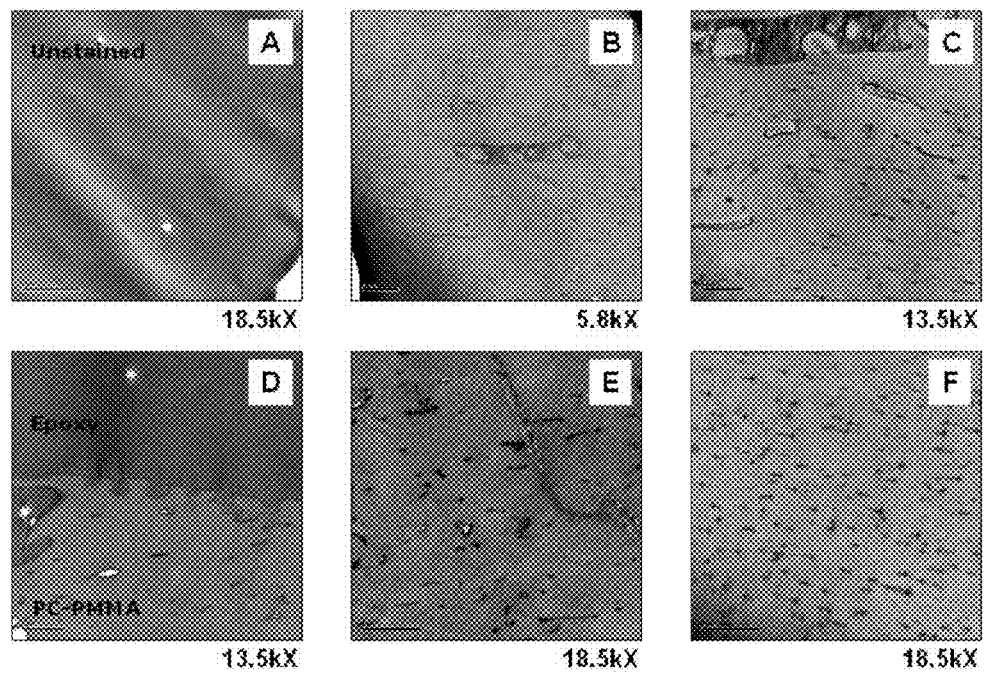
FIG. 5 shows transmission electron micrographs of ruthenium stained sample of a representative disclosed polycarbonate-PMMA copolymer.
Figure 6:
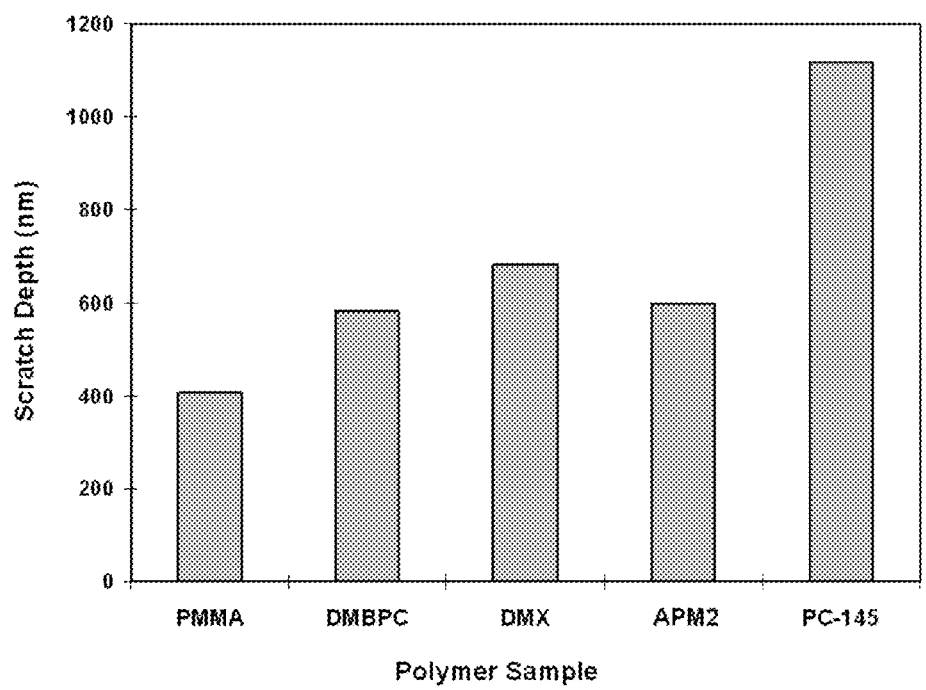
FIG. 6 shows representative scratch depth data for a representative disclosed polycarbonate-PMMA copolymer compared to comparator polymer samples.

Batch APM2 was prepared as described in Table 3, with use of unwashed macroinitiator. The resultant copolymer was dark colored. Transmission electron microscopy was used to analyze samples of Batch APM2. Briefly, ultrathin sections of copolymer samples were prepared using a microtome, and some sections were stained with ruthenium tetroxide. Ruthenium tetroxide preferentially stains the polycarbonate domains of the copolymer, but does not stain the PMMA domains of the copolymer. Representative micrograph images are shown in FIG. 5 (Panels A-C, unstained; Panels D-F, stained with ruthenium; level of magnification is indicated below each micrograph). As the images shown (see Panels D-F), the polycarbonate (stained dark) is uniformly dispersed in the light gray background of PMMA. The homogenous dispersion of polycarbonate and PMMA domains suggest the formation of a copolymer rather than merely physical blending of discrete polycarbonate and PMMA polymers. Without wishing to be bound by a particular theory, the uniformity of dispersion of the polycarbonate and PMMA domains of the copolymer is important for the observed clarity of the films prepared from the disclosed copolymers. Size characteristics of the APM2 copolymer are shown in Table 4 below, and scratch resistance properties are shown in Table 5 below. The comparator materials shown in Table 5 are as follows: PMMA is commercial grade PMMA with a Mw of 80 kg/mol; DMBPC is polycarbonate homopolymer prepared via interfacial polymerization with a Mw of 60 kg/mol and was prepared for these studies; and DMX is a commercially available polycarbonate polymer from SABIC IP; PC145 is a neat polycarbonate resin available internally at SABIC IP with a Mw of 26,200 and 55 kg/mol.

TABLE 4

| Sample | Mn | Mw | PDI |
| --- | --- | --- | --- |
| Macroinitiator | 3483 | 8843 | 2.53 |
| Copolymer, Batch APM1 | 2800 | 5800 | 2.07 |
| Copolymer, Batch APM2 | 3061 | 7146 | 2.33 |

TABLE 5

| Sample* | Scratch depth (nm) |
| --- | --- |
| PMMA | 407 |
| DMBPC | 582 |
| DMX | 683 |
| APM2 | 600 |
| PC145 | 1118 |

Batch APM3

Batch APM3 was prepared as described in Table 6, with the use of unwashed macroinitiator. The molar ratio of MMA:PC2-Min:CuBr:Bpy:Cu(0) in the polymerization reaction was about 50:1:1:2:0.5. Resultant copolymer was dark colored. In contrast to batches APM4, APM5, and APM6, the PC2-Min used in the preparation of APM3 was not subjected to any wash steps or vacuum drying either before or after synthesis of the PC2-Min (see discussion above regarding preparation of PC2-Min).

TABLE 6

| | | Batch* | | | |
| --- | --- | --- | --- | --- | --- |
| # | Item | APM3 | APM4 | APM5 | APM6 |
| 1 | MMA | 2.0 | 1.7 | 20 | 20 |
| 2 | PC2-Min | 3 | 2 | 2 | 2 |
| 3 | Bpy | 0.04 | 0.18 | 0.035 | 0.18 |
| 4 | AIBN | — | — | 0.01 | — |
| 5 | Cu(0) | 0.01 | 0.02 | — | 0.02 |
| 6 | CuBr | 0.03 | 0.10 | — | — |
| 7 | CuBr$_2$ | — | — | 0.078 | — |
| 8 | CuCl | — | — | — | 0.07 |
| 9 | Anisole | 200 | 3 | 20 | 20 |
| | Temperature (° C.) | 60 | 110 | 88 | 80 |
| | Reaction time (h) | 12 | 20 | 24 | 4 |

*All component amounts given in as weight amount (g), except anisole which is given as volume amount (mL).

Batch APM4

Batch APM4 was prepared as described in Table 6, with use of washed and dried macroinitiator. The molar ratio of MMA:PC2-Min:CuBr:Bpy:Cu(0) in the polymerization reaction was about 25:1:1:2.5:0.5. Resultant copolymer was dark colored.

Batch APM5

Figure 13:
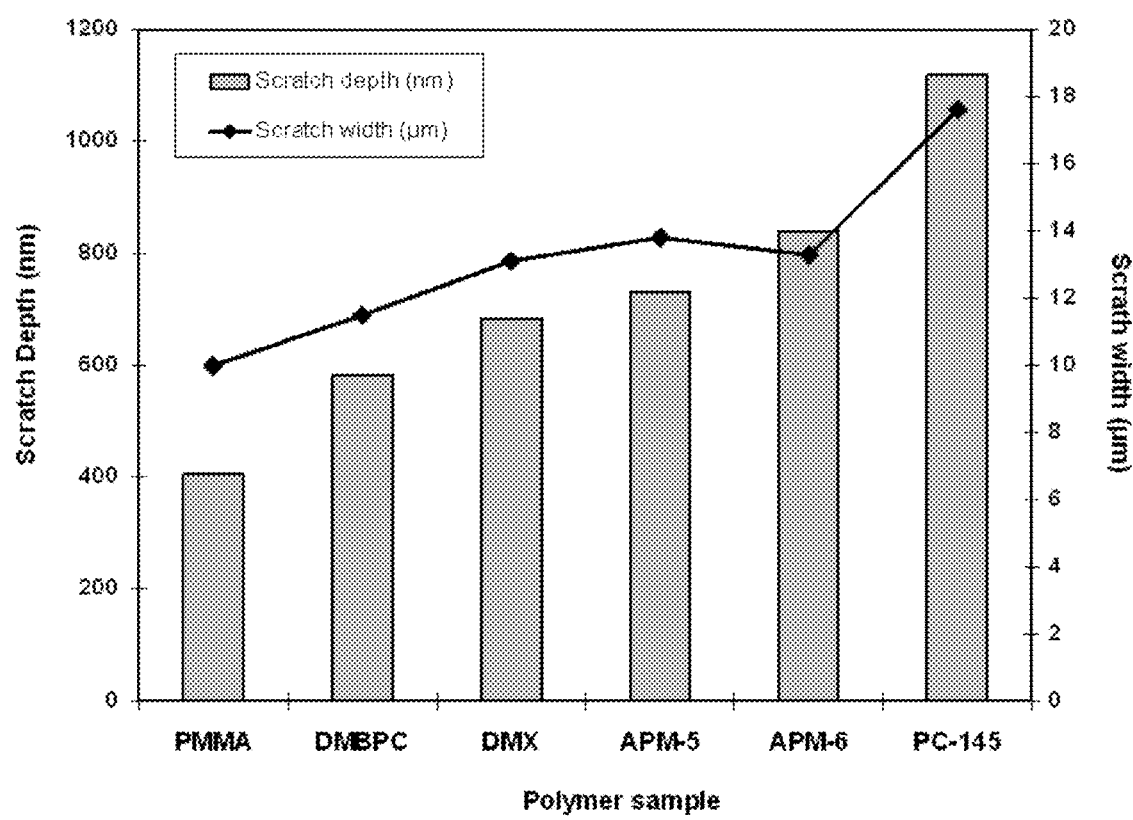
FIG. 13 shows representative scratch depth and width data for a representative disclosed polycarbonate-PMMA copolymer compared to comparator polymer samples.

Batch APM5 was prepared as described in Table 6, with use of washed and dried macroinitiator. The molar ratio of MMA:PC2-Min:AIBN:Bpy:CuBr$_2$ in the polymerization reaction was about 200:1:0.1:0.05:0.05. PMMA content was assessed using $^1$H NMR as described above for Batch APM1. The apparent MMA content was about 50 mol %. Further characterization of the molecular weight of the resulting copolymer is given below in Table 7, and nanoindentation data are given in Table 8 and FIG. 13. Size characteristics for the APM5 copolymer are shown in Table 7, and the data in Table 7 show the average of two runs with the standard deviation indicated. The scratch resistance properties for the copolymer batch are shown in Table 8. The comparator materials in Table 8 are as described above for Table 5.

Batch APM6

Batch APM3 was prepared as described in Table 6, with use of washed and dried macroinitiator. The molar ratio of MMA:PC2-Min:CuBr:Bpy:Cu(0) in the polymerization reaction was about 200:1:1:2.5:0.5. Resultant copolymer was dark colored. The apparent MMA content was about 88 mol % and was determined as described above. Further characterization of the molecular weight of the resulting copolymer is given below in Table 7, and nanoindentation data are given in Table 8 and FIG. 13. Size characteristics for the APM6 copolymer are shown in Table 7, and the data in Table 7 show the average of two runs with the standard deviation indicated. The scratch resistance properties for the copolymer batch are shown in Table 8. The comparator materials in Table 8 are as described above for Table 5.

TABLE 7

| Sample | Mn | Mw | PDI |
| --- | --- | --- | --- |
| Macroinitiator | 14656 ± 155 | 27271 ± 197 | 1.861 ± 0.006 |
| Copolymer, Batch APM5 | 16541 ± 286 | 31361 ± 49 | 1.896 ± 0.036 |
| Copolymer, Batch APM6 | 5790 ± 47 | 14043 ± 737 | 2.425 ± 0.108 |

TABLE 8

| Sample | Scratch depth (nm) | Scratch width (nm) |
|---|---|---|
| PMMA | 407.00 | 9.97 |
| DMBPC | 582.02 | 11.50 |
| DMX | 683.30 | 131.11 |
| APM5 | 732.00 | 13.80 |
| APM6 | 838.00 | 13.30 |
| PC145 | 1118.20 | 17.62 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for preparing a block copolymer comprising:
   a. providing a telechelic polycarbonate polymer with terminal hydroxyl groups;
      wherein the telechelic polycarbonate polymer has a weight average molecular weight of at least about 3,400; and
      wherein the telechelic polycarbonate polymer comprises aromatic carbonate repeating units;
   b. esterifying the hydroxyl groups by reaction of the telechelic polycarbonate polymer with an acid halide having a structure represented by a formula:

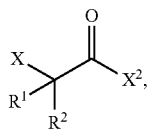

wherein $R^1$ is selected from the group consisting of hydrogen, C1-C6 alkyl, —(C1-C6 alkyl)-aryl, and aryl;
   wherein $R^2$ is selected from the group consisting of C1-C6 alkyl, —(C1-C6 alkyl)-aryl, and aryl; and
   wherein each of $X^1$ and $X^2$ is halogen;
   c. thereby yielding a telechelic polycarbonate macroinitiator having a structure represented by a formula:

wherein PC is a polycarbonate polymer comprising aromatic carbonate repeating units; and
   wherein $Z^1$ and $Z^2$ have a formula:

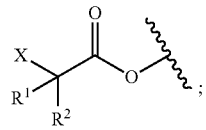

d. reacting the telechelic polycarbonate macroinitiator with a vinyl monomer by atom transfer radical polymerization; and
      wherein the atom transfer radical polymerization reaction comprises a catalyst, a catalyst ligand, the vinyl monomer, and the telechelic polycarbonate macroinitiator,
      wherein the catalyst is a transition metal or a transition metal salt, and wherein the transition metal is selected from the group consisting of Ti, Mo, Re, Fe, Ru, Os, Rh, Co, Ni, Pd, and Cu; and
      wherein the ligand is selected from the group consisting of 2,2'-bipyridine, 4,4'-di(5-nonyl)-2,2'-bipyridine, N,N,N',N'-tetramethylethylenediamine, N-propyl(2-pyridyl)methanimine, 2,2':6',2"-terpyridine, 4,4',4"-tris(5-nonyl)-2,2':6',2"-terpyridine, N,N,N',N",N"-pentamethyldiethylenetriamine, N,N-bis(2-pyridylmethyl)octylamine, 1,1,4,7,10,10-hexamethyltriethylenetetramine, tris[2-(dimethylamino)ethyl]amine, tris[(2-pyridyl)methyl]amine, 1,4,8,11-tetraaza-1,4,8,11-tetramethylcyclotetradecane, N,N,N',N'-tetrakis(2-pyridylmethyl)ethylenediamine, diethylenetriamine, triethylenetetramine, N,N-bis(2-pyridylmethyl)amine, tris[2-aminoethyl]amine, 1,4,8,11-tetraazacyclotetradecane, and N,N,N',N'-tetrakis(2-pyridylmethyl)ethylenediamine;
   e. thereby yielding a block copolymer
      having a weight average molecular weight from about 1,000 to about 70,000; and
   wherein the molar ratio of the vinyl monomer, the telechelic polycarbonate macroinitiator, the catalyst, and the catalyst ligand is about 200:1:1:2.5.

2. The method of claim 1, wherein $R^1$ is selected from the group consisting of methyl, ethyl, and propyl, isopropyl.

3. The method of claim 1, wherein $X^1$ and $X^2$ are each bromo, wherein $R^1$ and $R^2$ are each methyl.

4. The method of claim 1, wherein the telechelic polycarbonate macroinitiator has a structure represented by a formula:

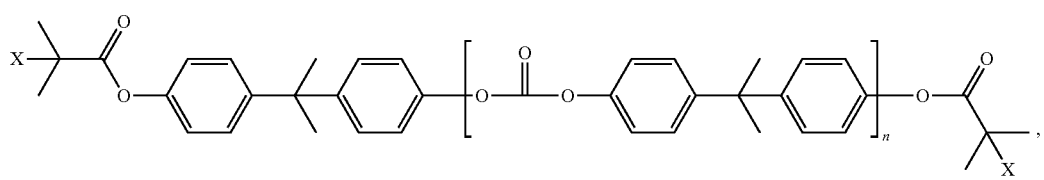

wherein the telechelic polycarbonate macroinitiator has a Mn of about 500 to about 40,000;
wherein the telechelic polycarbonate macroinitiator has a Mw of about 1,000 to about 70,000; and wherein X is selected from bromo and or chloro.

5. The method of claim 4, wherein the telechelic polycarbonate macroinitiator has a Mn of about 10,000 to about 25,000; and wherein the telechelic polycarbonate macroinitiator has a Mw of about 20,000 to about 50,000.

6. The method of claim 1, wherein the telechelic polycarbonate macroinitiator has a structure represented by a formula:

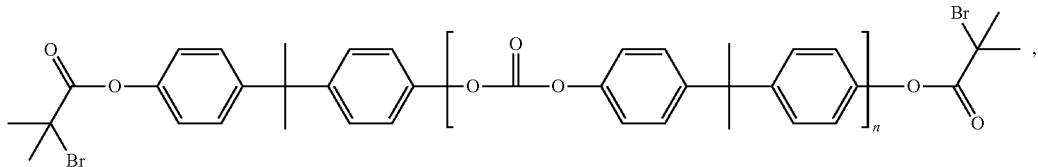

wherein the telechelic polycarbonate macroinitiator has a Mn of about 500 to about 40,000;
and wherein the telechelic polycarbonate macroinitiator has a Mw of about 1,000 to about 70,000.

7. The method of claim 6, wherein the telechelic polycarbonate macroinitiator has a Mn of about 10,000 to about 25,000; and wherein the telechelic polycarbonate macroinitiator has a Mw of about 20,000 to about 50,000.

8. The method of claim 1, wherein the telechelic polycarbonate polymer with terminal hydroxyl groups has a structure represented by the formula:

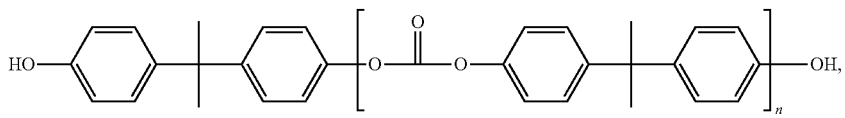

wherein the telechelic polycarbonate polymer has a Mn of about 2,000 to about 35,000; and
wherein the telechelic polycarbonate polymer has a Mw of about 3,400 to about 70,000.

9. The method of claim 8, wherein the telechelic polycarbonate polymer has a Mn of about 5,000 to about 25,000; and wherein the telechelic polycarbonate macroinitiator has a Mw of about 10,000 to about 50,000.

10. The method of claim 1, wherein the telechelic polycarbonate polymer is reacted with an acid halide at about 60° C. for about 24 hours.

11. The method of claim 1, wherein telechelic polycarbonate polymer with terminal hydroxyl groups has a weight average molecular weight of about 10,000 to about 50,000.

12. The method of claim 1, wherein the vinyl monomer is selected from the group consisting of methyl methacrylate, acrylate, styrene, and monoethylenically unsaturated nitrile monomer.

13. The method of claim 1, wherein the vinyl monomer is methyl methacrylate.

14. The method of claim 13, wherein the polymethyl methacrylate block is about 10% wt to about 90% wt of the block copolymer composition.

15. The method of claim 1, wherein the block copolymer has a structure represented by a formula:

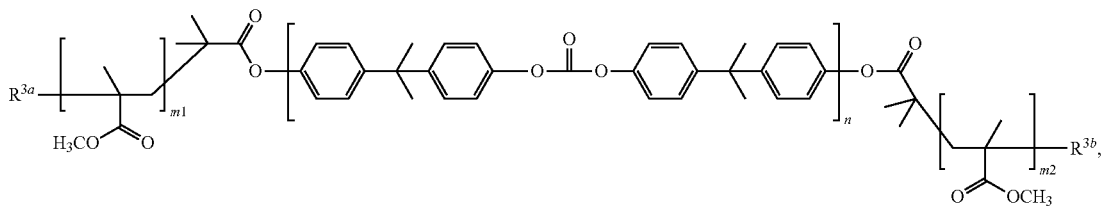

wherein R3a and R3b are independently selected from halogen or hydrogen, provided that the halogen is the same halogen as present in the telechelic polycarbonate macroinitiator used in the preparation of the block copolymer;

wherein the block copolymer has a Mn of about 500 to about 40,000; and wherein the block copolymer has a Mw of about 1,000 to about 70,000.

16. The method of claim 15, wherein the block copolymer has a Mn of about 10,000 to about 25,000; and wherein the block copolymer has a Mw of about 20,000 to about 50,000.

17. The method of claim 1, wherein the block copolymer has a scratch depth from about 500 nm to about 1000 nm when tested under a load of 40 mN with a three-sided Berkovich-shaped diamond indenter with a face front of about 0.15 μm.

18. The method of claim 1, wherein the block copolymer has a scratch width from about 10 nm to about 14 nm when tested under a load of 40 mN with a three-sided Berkovich-shaped diamond indenter with a face front of about 0.15 μm.

19. The method of claim 1, wherein the catalyst is copper or a copper salt.

20. The method of claim 1, wherein the catalyst is selected from the group consisting of CuBr, CuCl, CuCl$_2$, and CuBr$_2$.

21. The method of claim 1, wherein the catalyst ligand is selected from the group consisting of 2,2'-bipyridine, N,N,N',N'',N''-pentamethyldiethylenetriamine, diethylenetriamine, triethylenetetramine, N,N-bis(2-pyridylmethyl)amine, tris[2-aminoethyl]amine, 1,4,8,11-tetraazacyclotetradecane, and 1,1,4,7,10,10-hexamethyltriethylenetetramine.

22. The method of claim 1, wherein the atom transfer radical polymerization reaction comprises a second initiator.

23. The method of claim 22, wherein the second initiator is an azo initiator for free radical polymerization.

24. The method of claim 23, wherein the azo initiator comprises 1,1'-azobis(cyclohexanecarbonitrile), 2,2'-azobis(2-methylpropionitrile), or both.

25. A method for preparing a block copolymer comprising:
a. providing a telechelic polycarbonate polymer with terminal hydroxyl groups;
   wherein the telechelic polycarbonate polymer has a weight average molecular weight of at least about 3,400; and
   wherein the telechelic polycarbonate polymer comprises aromatic carbonate repeating units;
b. esterifying the hydroxyl groups by reaction of the telechelic polycarbonate polymer with 2-bromoisobutyryl bromide;
c. thereby yielding a telechelic polycarbonate macroinitiator having a structure represented by a formula:

wherein PC is a polycarbonate polymer comprising aromatic carbonate repeating units;
   wherein $Z^1$ and $Z^2$ has have a formula:

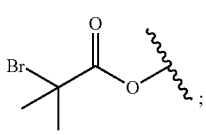 [SMILES: *OC(=O)C(C)(C)Br]

d. reacting the telechelic polycarbonate macroinitiator with a vinyl monomer by atom transfer radical polymerization; and wherein the atom transfer radical polymerization reaction comprises a catalyst, a catalyst ligand, the vinyl monomer, the telechelic polycarbonate macroinitiator, and a second initiator;
   wherein the vinyl monomer is methyl methacrylate;
   wherein the catalyst is a copper salt;
   wherein the catalyst ligand is 2,2'-bipyridine;
   wherein the second initiator is azobisisobutyronitrile; and
   wherein the molar ratio of the vinyl monomer, telechelic polycarbonate macroinitiator, the catalyst, the catalyst ligand and the second initiator is about 200:1:0.05:0.05:0.1;
e. thereby yielding a block copolymer;
   wherein the block copolymer comprises a polycarbonate block and a polymethyl methacrylate block;
   wherein the polycarbonate block comprises from about 10% wt to about 90% wt of the block copolymer; and
   wherein the block copolymer has a weight average molecular weight from about 20,000 to about 50,000.

26. A method for preparing a block copolymer comprising:
a. providing a telechelic polycarbonate polymer with terminal hydroxyl groups;
   wherein the telechelic polycarbonate polymer has a weight average molecular weight of at least about 3,400; and
   wherein the telechelic polycarbonate polymer comprises aromatic carbonate repeating units;
b. esterifying the hydroxyl groups by reaction of the telechelic polycarbonate polymer with an acid halide having a structure represented by a formula:

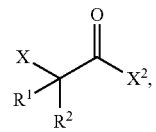

wherein $R^1$ is selected from the group consisting of hydrogen, C1-C6 alkyl, —(C1-C6 alkyl)-aryl, and aryl;
   wherein $R^2$ is selected from the group consisting of C1-C6 alkyl, —(C1-C6 alkyl)-aryl, and aryl; and
   wherein each of $X^1$ and $X^2$ is halogen;
c. thereby yielding a telechelic polycarbonate macroinitiator having a structure represented by a formula:

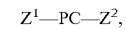

wherein PC is a polycarbonate polymer comprising aromatic carbonate repeating units; and
   wherein $Z^1$ and $Z^2$ have a formula:

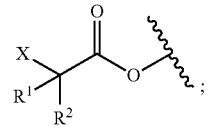

d. reacting the telechelic polycarbonate macroinitiator with a vinyl monomer by atom transfer radical polymerization;
   wherein the atom transfer radical polymerization reaction comprises a catalyst, a catalyst ligand, the vinyl monomer, the telechelic polycarbonate macroinitiator, and a second initiator;

wherein the catalyst is a transition metal or a transition metal salt, and wherein the transition metal is selected from the group consisting of Ti, Mo, Re, Fe, Ru, Os, Rh, Co, Ni, Pd, and Cu;

wherein the ligand is selected from the group consisting of 2,2'-bipyridine, 4,4'-di(5-nonyl)-2,2'-bipyridine, N,N,N',N'-tetramethylethylenediamine, N-propyl(2-pyridyl)methanimine, 2,2':6',2''-terpyridine, 4,4',4''-tris(5-nonyl)-2,2':6',2''-terpyridine, N,N,N',N'',N''-pentamethyldiethylenetriamine, N,N-bis(2-pyridylmethyl)octylamine, 1,1,4,7,10,10-hexamethyltriethylenetetramine, tris[2-(dimethylamino)ethyl]amine, tris[(2-pyridyl)methyl]amine, 1,4,8,11-tetraaza-1,4,8,11-tetramethylcyclotetradecane, N,N,N',N'-tetrakis(2-pyridylmethyl)ethylenediamine, diethylenetriamine, triethylenetetramine, N,N-bis(2-pyridylmethyl)amine, tris[2-aminoethyl]amine, 1,4,8,11-tetraazacyclotetradecane, and N,N,N',N'-tetrakis(2-pyridylmethyl)ethylenediamine; and wherein the second initiator is selected from the group consisting of a peroxide, a hydroperoxide, and an azo initiator for free radical polymerization;

e. thereby yielding a block copolymer having a weight average molecular weight from about 1,000 to about 70,000; and wherein the molar ratio of the vinyl monomer, the telechelic polycarbonate macroinitiator, the catalyst, the catalyst ligand, and the second initiator is about 200:1:0.05:0.05:0.1.

27. The method of claim 26, wherein $R^1$ is selected from the group consisting of methyl, ethyl, and propyl, isopropyl.

28. The method of claim 26, wherein $X^1$ and $X^2$ are each bromo, wherein $R^1$ and $R^2$ are each methyl.

29. The method of claim 26, wherein the telechelic polycarbonate macroinitiator has a structure represented by a formula:

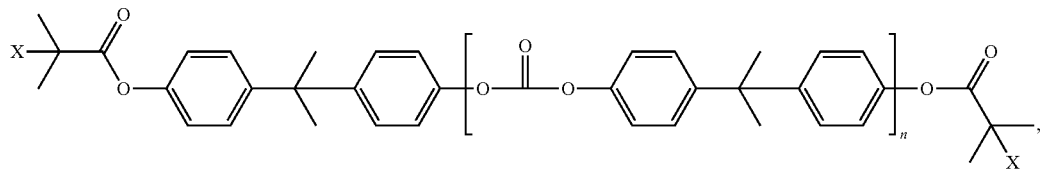

wherein the telechelic polycarbonate macroinitiator has a Mn of about 500 to about 40,000;
wherein the telechelic polycarbonate macroinitiator has a Mw of about 1,000 to about 70,000; and wherein X is selected from bromo or chloro.

30. The method of claim 29, wherein the telechelic polycarbonate macroinitiator has a Mn of about 10,000 to about 25,000; and wherein the telechelic polycarbonate macroinitiator has a Mw of about 20,000 to about 50,000.

31. The method of claim 26, wherein the telechelic polycarbonate macroinitiator has a structure represented by a formula:

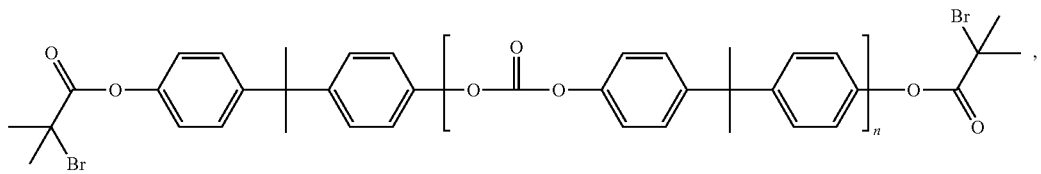

wherein the telechelic polycarbonate macroinitiator has a Mn of about 500 to about 40,000;
and wherein the telechelic polycarbonate macroinitiator has a Mw of about 1,000 to about 70,000.

32. The method of claim 31, wherein the telechelic polycarbonate macroinitiator has a Mn of about 10,000 to about 25,000; and wherein the telechelic polycarbonate macroinitiator has a Mw of about 20,000 to about 50,000.

33. The method of claim 26, wherein the telechelic polycarbonate polymer with terminal hydroxyl groups has a structure represented by the formula:

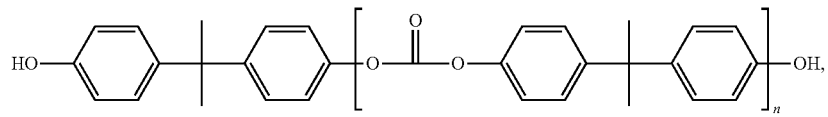

wherein the telechelic polycarbonate polymer has a Mn of about 2,000 to about 35,000; and
wherein the telechelic polycarbonate polymer has a Mw of about 3,400 to about 70,000.

34. The method of claim 33, wherein the telechelic polycarbonate polymer has a Mn of about 5,000 to about 25,000; and wherein the telechelic polycarbonate macroinitiator has a Mw of about 10,000 to about 50,000.

35. The method of claim 26, wherein the telechelic polycarbonate polymer is reacted with an acid halide at about 60° C. for about 24 hours.

36. The method of claim 26, wherein telechelic polycarbonate polymer with terminal hydroxyl groups has a weight average molecular weight of about 10,000 to about 50,000.

37. The method of claim 26, wherein the vinyl monomer is selected from the group consisting of methyl methacrylate, acrylate, styrene, and monoethylenically unsaturated nitrile monomer.

38. The method of claim 26, wherein the vinyl monomer is methyl methacrylate.

39. The method of claim 38, wherein the polymethyl methacrylate block is about 10% wt to about 90% wt of the block copolymer composition.

40. The method of claim 26, wherein the block copolymer has a structure represented by a formula:

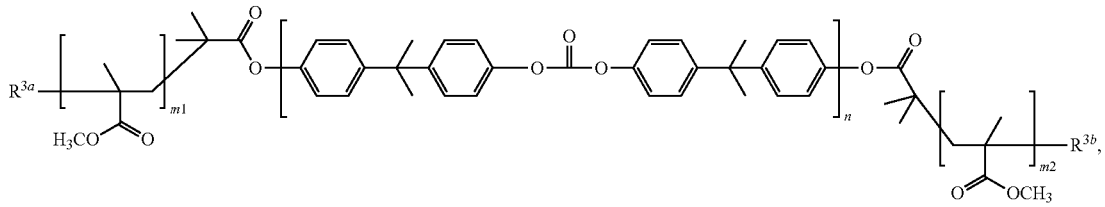

wherein R3a and R3b are independently selected from halogen or hydrogen, provided that the halogen is the same halogen as present in the telechelic polycarbonate macroinitiator used in the preparation of the block copolymer;
wherein the block copolymer has a Mn of about 500 to about 40,000; and
wherein the block copolymer has a Mw of about 1,000 to about 70,000.

41. The method of claim 40, wherein the block copolymer has a Mn of about 10,000 to about 25,000; and wherein the block copolymer has a Mw of about 20,000 to about 50,000.

42. The method of claim 26, wherein the block copolymer has a scratch depth from about 500 nm to about 1000 nm when tested under a load of 40 mN with a three-sided Berkovich-shaped diamond indenter with a face front of about 0.15 μm.

43. The method of claim 26, wherein the block copolymer has a scratch width from about 10 nm to about 14 nm when tested under a load of 40 mN with a three-sided Berkovich-shaped diamond indenter with a face front of about 0.15 μm.

44. The method of claim 26, wherein the catalyst is copper or a copper salt.

45. The method of claim 26, wherein the catalyst is selected from the group consisting of CuBr, CuCl, CuCl$_2$, and CuBr$_2$.

46. The method of claim 26, wherein the catalyst ligand is selected from the group consisting of 2,2'-bipyridine, N,N,N', N",N"-pentamethyldiethylenetriamine, diethylenetriamine, triethylenetetramine, N,N-bis(2-pyridylmethyl)amine, tris [2-aminoethyl]amine, 1,4,8,11-tetraazacyclotetradecane, and 1,1,4,7,10,10-hexamethyltriethylenetetramine.

47. The method of claim 26, wherein the azo initiator comprises 1,1'-azobis(cyclohexanecarbonitrile), 2,2'-azobis (2-methylpropionitrile), or both.

48. The method of claim 26, wherein the polymethyl methacrylate block is about 40% wt to about 90% wt of the block copolymer composition.

* * * * *